(12) United States Patent
Zhang

(10) Patent No.: US 12,478,684 B2
(45) Date of Patent: Nov. 25, 2025

(54) OLIGONUCLEOTIDE-POLYMER MIKTOARM CONJUGATES AND METHODS OF USE

(71) Applicant: NORTHEASTERN UNIVERSITY, Boston, MA (US)

(72) Inventor: Ke Zhang, Natick, MA (US)

(73) Assignee: NORTHEASTERN UNIVERSITY, Boston, MA (US)

( * ) Notice: Subject to any disclaimer, the term of this patent is extended or adjusted under 35 U.S.C. 154(b) by 972 days.

(21) Appl. No.: 17/602,307

(22) PCT Filed: Apr. 7, 2020

(86) PCT No.: PCT/US2020/027026
§ 371 (c)(1),
(2) Date: Oct. 8, 2021

(87) PCT Pub. No.: WO2020/210207
PCT Pub. Date: Oct. 15, 2020

(65) Prior Publication Data
US 2022/0160884 A1    May 26, 2022

Related U.S. Application Data

(60) Provisional application No. 62/832,317, filed on Apr. 11, 2019.

(51) Int. Cl.
*A61K 47/60* (2017.01)
*A61K 47/54* (2017.01)
*A61K 47/69* (2017.01)
*A61K 49/00* (2006.01)
*C12N 15/11* (2006.01)

(52) U.S. Cl.
CPC ............ *A61K 47/60* (2017.08); *A61K 47/549* (2017.08); *A61K 47/6929* (2017.08); *A61K 49/0032* (2013.01); *A61K 49/0054* (2013.01); *C12N 15/111* (2013.01); *C12N 2310/11* (2013.01); *C12N 2310/351* (2013.01); *C12N 2310/51* (2013.01); *C12N 2320/32* (2013.01)

(58) Field of Classification Search
CPC .. A61K 47/60; A61K 47/549; A61K 47/6929; A61K 49/0032; A61K 49/0054; A61K 47/56; A61K 47/605; A61K 47/6923; C12N 15/111; C12N 2310/11; C12N 2310/351; C12N 2310/51; C12N 2320/32; C12N 15/1137
See application file for complete search history.

(56) References Cited

U.S. PATENT DOCUMENTS

| | | |
|---|---|---|
| 8,968,765 B2 | 3/2015 | Chen et al. |
| 9,084,825 B2 | 7/2015 | Montefeltro et al. |
| 9,193,969 B2 | 11/2015 | Montefeltro et al. |
| 9,867,885 B2 | 1/2018 | Monahan et al. |
| 10,385,335 B2 | 8/2019 | Mcgall |
| 10,590,414 B2 | 3/2020 | Zhang et al. |
| 11,104,901 B2 | 8/2021 | Zhang et al. |
| 2002/0001845 A1 | 1/2002 | Klaerner et al. |
| 2005/0112616 A1 | 5/2005 | Lee et al. |
| 2005/0164974 A1 | 7/2005 | Gold et al. |
| 2005/0214782 A1 | 9/2005 | Chen et al. |
| 2011/0077389 A1 | 3/2011 | Nelson et al. |
| 2012/0322991 A1 | 12/2012 | Montefeltro et al. |
| 2014/0120158 A1 | 5/2014 | Montefeltro et al. |
| 2014/0315795 A1 | 10/2014 | Carmona et al. |
| 2015/0011611 A1 | 1/2015 | Kim et al. |
| 2015/0056158 A1 | 2/2015 | Gunatillake et al. |
| 2016/0272971 A1 | 9/2016 | Almeida et al. |
| 2018/0230467 A1 | 8/2018 | Zhang et al. |
| 2018/0369142 A1 | 12/2018 | Zhang et al. |
| 2019/0292310 A1 | 9/2019 | Zhang et al. |
| 2019/0292549 A1 | 9/2019 | Zhang et al. |
| 2020/0190519 A1 | 6/2020 | Zhang et al. |
| 2025/0049935 A1 | 2/2025 | Zhang et al. |
| 2025/0135013 A1 | 5/2025 | Zhang et al. |
| 2025/0163418 A1 | 5/2025 | Zhang |

FOREIGN PATENT DOCUMENTS

| | | |
|---|---|---|
| WO | 2017/024148 A1 | 2/2017 |
| WO | 2020/210207 A2 | 10/2020 |
| WO | 2023/023662 A1 | 2/2023 |
| WO | 2023/115031 A1 | 6/2023 |

OTHER PUBLICATIONS

Aghajanzadeh, M., Zamani, M., Rostamizadeh, K., Sharafi, A., & Danafar, H. (2018). The role of miktoarm star copolymers in drug delivery systems. Journal of Macromolecular Science, Part A, 55(7), 559-571. https://doi.org/10.1080/10601325.2018.1483200 (Year: 2018).*
Synthesis of Biocompatible PEG-Based Star Polymers with Cationic and Degradable Core for siRNA Delivery. Cho et al. Biomacromolecules 2011 12 (10), 3478-3486 DOI: 10.1021/bm2006455 (Year: 2011).*
Fei (Journal of the American Chemical Society 139.31 (2017): 10605-10608) (Year: 2017).*
Adams, D., et al., "Patisiran, an RNAi Therapeutic, for Hereditary Transthyretin Amyloidosis", N. Engl J Med 379:11-21 (2018) Abstract.
Alemdaroglu et al., "Cellular Uptake of DNA Block Copolymer Micelles with Different Shapes," Macromol Rapid Commun. 2008. 29:326-329. (Year: 2008).
Alemdaroglu et al., "DNA Block Copolymer Micelles—A Combinatorial Tool for Cancer Nanotechnology," Adv. Mater. 2008. 20:899-902. (Year: 2008).

(Continued)

*Primary Examiner* — Anne M. Gussow
*Assistant Examiner* — Kyle T Rega
(74) *Attorney, Agent, or Firm* — HAMILTON, BROOK, SMITH & REYNOLDS, P.C.

(57) ABSTRACT

Monodisperse structures with precise numbers of polymer arms and oligonucleotide chains conjugated to a backbone are disclosed. The structures, referred to miktoarm conjugates, are resistant to nuclease degradation and are capable of regulating gene expression in the absence of a co-carrier.

18 Claims, 9 Drawing Sheets

Specification includes a Sequence Listing.

(56) References Cited

OTHER PUBLICATIONS

Alemdaroglu et al., "DNA meets synthetic polymers-highly versatile hybrid materials," Org Biomol Chem. 2007. 5:1311-1320. (Year: 2007).
Bazzi et al., "Adenine-Containing Block Copolymers via Ring-Opening Metathesis Polymerization: Synthesis and Self-Assembly into Rod Morphologies," Macromolecules. 2002. 35(26):9617-9620. (Year: 2002).
Biagini et al., "Investigation into the ROMP Copolymerization of Peptide- and PEG-Functionalized Norbornene Derivatives," Part A: Polym Chem. 2007. 45:3178-3190. (Year: 2007).
Biswas. "Synthesis And Applications of Ring Opening Metathesis Polymerization Based Functional Block Copolymers." 2010. Dissertation. Unviersity of Central Florida. (Year: 2010).
Breitenkamp et al., "Novel Amphiphilic Graft Copolymers Prepared by Ring-Opening Metathesis Polymerization of Poly(ethylene glycol)-Substituted Cyclooctene Macromonomers," Macromolecules. 2002. 35:9249-9252. (Year: 2002).
Breitenkamp et al., "Pentalysine-Grafted ROMP Polymers for DNA Complexation and Delivery," Biomacromolecules. 2008. 9:2495-2500. (Year: 2008).
Breitenkemp. "Oligopeptide-functionalized Graft Copolymers: Synthesis and Applications in Nucleic Acid Delivery." 2009. Dissertation. University of Massachusetts Amherst. (Year: 2009).
Carneiro et al., "Stimuli-responsive organization of block copolymers on DNA nanotubes," Chem Sci. 2012. 3:1980-1986. (Year: 2012).
Carrillo et al., "Explicit Solvent Simulations of Friction between Brush Layers of Charged and Neutral Bottle-Brush Macromolecules," Macromoecules. 2012. 45:8880-8891. (Year: 2012).
Castanollo, D., and Rossi, J.J., "The promises and pitfalls of RNA-interfence-based therapeutics" Nature 457:426-433 (2009).
Cavalieri et al., "Assembly and Functionalization of DNA—Polymer ivlicrocapsules," ACS Nano. 2009. 3(1):234-240. (Year: 2009).
Chakroborty, C., et al., "Therapeutic miRNA and siRNA: Moving from Bench to Clinic as Next Generation Medicine," Mol. Ther. Nucleic Acids 8:132-143 (2017).
Chu et al., "Application of living Free Radical Polymerization for Nucleic Acid Delivery," Accounts of Chemical Research. 2012. 45(7):1089-1099. (Year: 2012).
Cogoi et al., "Antiproliferative activity of a triplex-forming oligonucleotide recognizing a Ki-ras polypurine/polypyrimidine motif correlates with protein binding," Cancer Gene Therapy. 2004. 11:465-476. (Year: 2004).
Cutler et al., "Polyvalent Nucleic Add Nanostructures," J Am Chem Soc. 2011. 133:9254-9257. (Year: 2011).
Dahlman, J.E., et al., "In vivo endothelial siRNA delivery using polymeric nanoparticles with low molecular weight", Nat Nanotechnol 9(8):648-655 (2014).
Davies et al., "Synthesis of nucleic-acid base containing norbornene derivatives as monomers for ring-opening-metathesis-polymerization," J. Chem. Soc., Perkin Trans. 2001. 1:3365-3381. (Year: 2001).
De Fougerolles, H.-P., et al., "Interfering with disease: a progress report on siRNA-based theapeutics", Nature Rev. Drug Discov 6:443-92 (2007).
Eckstein , F., (ed) Oligonucleotides and Analogues: A Practical Approach (Practical Approach Series 83) 1st Ed Oxford University Press (1992). Abstract.
Eckstein, F., "Phosphorothioates, Essential Components of Theapeutic Oligonucleotides,", Nucleic Acid Ther 24:374-387 (2014) Abstract.
Feuz et al., "Adsorption of Molecular Brushes with Polyelectrolyte Backbones onto Oppositely Charged Surfaces: A Self-Consistent-Field Theory," Langmuir. 2008. 24:7232-7244. (Year: 2008).
Gao et al., "Synthesis of Acid-Labile PEG and PEG-Doxorubicin-Conjugate Nanoparticles via Brush-First Romp," ACS Macro Lett. 2014. 3:854-857. (Year: 2014).

Gaziova et al. "Chemically Defined Polyethylene Glycol siRNA Conjugates with Enhanced Gene Silencing Effect", Bioorganic & Medicinal Chemistry 22 (2014), 2320-2326.
Gibbs et al., "Polymer-DNA Hybrids as Electrochemical Probes for the Detection of DNA," J. Am. Chem. Soc. 2005. 12:1170-1178. (Year: 2005).
Gutekunst et al., "A General Approach to Sequence-Controlled Polymers Using Macrocyclic Ring Opening Metathesis Polymerization ," J Am Chem Soc. 2015. 137:8038-8041. (Year: 2015).
Hensarling, et al.,"'Clicking' Polymer Brushes with Thiol-yne Chemistry: Indoors and Out", J. Am. Chem Soc 131:14673-14675 (2009) Abstract.
Hortz et al., "Cylindrical Brush Polymers with Polysarcosine Side Chains: A Novel Biocompatible Carrier for Biomedical Applications," Macromolecules. 2015. 48:2074-2086. (Year: 2015).
International Search Report and Written Opinion for International Application No. PCT/US2016/45576 dated: Dec. 15, 2016; 12 pages.
International Search Report and Written Opinion received for PCT Patent Application No. PCT/US22/075240, mailed on Dec. 16, 2022, 20 pages.
Invitation to Pay Additional Fee received for PCT Patent Application No. PCT/US16/45576, mailed on Oct. 18, 2016, 2 pages.
Iruthayaraj et al., "Viscoelastic Properties of Adsorbed Bottle-brush Polymer Layers Studied by Quartz Crystal . Mkrobalance—Dissipation Ivleasurements," J Phys Chem C. 2008. 112:15028-15036. (Year: 2008).
James et al., "Poly(oligonucleotide)," Journal of the American Chemical Society. 2014. 136:11216-11219. (Year: 2014).
Jeong et al., "Novel Polymer-DNA Hybrid Polymeric Micelles Composed of Hydrophobic Poly(D,L-lactic-co-glycolic Acid) and Hydrophilic Oligonucleotides," Bioconjugate Chem. 2001. 12:917-923. (Year: 2001).
Jia et al., "Facile synthesis of nucleic acid-polymer amphiphiles and their self-assembly," Chem Commun. 2015. 51:7843-7846. (Year: 2015).
Jia, et al., "Depth-Profiling the Nuclease Stability and the Gene Silencing Efficacy of Brush-Architectured Poly (ethylene glycol)-DNA Conjugates," J. Am. Chem. Soc. 2017, 139, 10605-10608.
Jia. "Improving the biopharmaceutical properties of oligonucleotides and oligopeptides through polymer conjugation and architecture design". Dissertation. Jul. 7, 2017. (Year: 2017).
Johnson et al., "Core-Clickable PEG-Branch-Azide Bivalent-Bottle-Brush Polymers by ROMP: Grafting-Through and Clicking-To," J Am Chem Soc. 2011. 133:559-566. (Year: 2011).
Kano et al., "Polymer Brush-Stabilized Polyplex for a siRNA Carrier with long Blood Circulatory Half-life," Advanced Materials Research. 2008. 47-50: 762-764. Abstract. (Year: 2008).
Ku et al., "Nucleic Acid Aptamers: An Emerging Tool for Biotechnology and Biomedical Sensing," Sensors. 2015. 15:16281-16313. (Year: 2015).
Laschewsky A. (2014). 'Structures and Synthesis of Zwitterionic Polymers', Polymers, 6(5):1544-1601.
Lee, et al., "A coarse-grained model for polyethylene oxide and polyethylene glycol: conformation and hydrodynamics", J Phys. Chem B 113(40):13185-94 (2009).
Lee, et al., "Amphiphilic siRNA Conjugates for Co-Delivery of Nucleic Acids and Hydrophobic Drugs," Bioconjugate Chemistry, 2017, 28, 2051-2061 (Year: 2017).
Li et al. (2016). 'Stimuli-responsive clustered nanoparticles for improved tumor penetration and therapeutic efficacy', Proc. Nat. Acad. Sci., 113:4164-4169.
Li et al., "Reversible and Chemically Programmable Micelle Assembly with DNA Block-Copolymer Amphiphiles," Nano Letters. 2004. 4(6):1055-1058. (Year: 2004).
Liu, J., et al., "'Brush-First' Method for the Parellel Synthesis of Photocleavable Nitroxide-Labeled Poly(ethylene glycol) Star Polymers", J. Am Chem Soc 134:16337-16344 (2012).
Logie, et al., "PEG-Graft Density Controls Polymeric Nanoparticle Micelle Stability," Chemistry of Materials, 2014, 26, 2847-2855. (Year: 2014).
Lu et al., "Polycondensation of Polymer Brushes via DNA Hybridization," J Am Chem Soc. 2014. 136:10214-10217. (Year: 2014).

(56) References Cited

OTHER PUBLICATIONS

Kumar, et al., "Polymeric Delivery of Therapeutic Nucleic Acids;" Chemical Reviews, vol. 121, No. 18, May 3, 2021, pp. 11527-11652.

Lu, et al., "Synthetic approaches for copolymers containing nucleic acids and analogues: challenges and opportunities", Polymer Chemistry, vol. 12, No. 15, Mar. 29, 2021, pp. 2193-2204, Retrieved from the Internet: URL:https://pubs.rsc.org/en/content/articlepdf/2021/py/d0py01707h>.

Sanchez, et al: "Easy introduction of maleimides at different positions of oligonucleotide chains for conjugation purposes", Organic & Biomolecular Chemistry, vol. 10, No. 42, 2012, pp. 8478-8483.

Wang, et al: "A Long-Circulating Vector for Aptamers Based upon Polyphosphodiester-Backboned Molecular Brushes", Angewandte Chemie International Edition, vol. 61, No. 41, Oct. 10, 2022, XP093034301, Retrieved from the Internet: URL:https://onlinelibrary.wiley.com/doi/fu 11-xml/10.1002/anie.202204576>.

Wang, et al: "Precision Tuning of DNA- and Poly(ethylene glycol)-Based Nanoparticles via Coassembly for Effective Antisense Gene Regulation", Chemistry of Materials, vol. 29, No. 23, Nov. 27, 2017, pp. 9882-9886.

Wang, et al: "Self-Assembled DNA-PEG Bottlebrushes Enhance Antisense Activity and Pharmacokinetics of Oligonucleotides", Applied Materials & Interfaces, vol. 12, No. 41, Sep. 16, 2020, pp. 45830-45837.

Whitfield, et al: "Functional DNA-Polymer Conjugates", Chemical Reviews, vol. 121, No. 18, Mar. 19, 2021, pp. 11030-11084, Retrieved from the Internet: URL:https://pubs.acs.org/doi/pdf/10.1021/a cs.chemrev.0c01074>.

International Search Report and Written Opinion for International Application No. PCT/US2022/081857, entitled "Bottlebrush Conjugates for use as Oligonucleotide Enhancers," mailed on Apr. 12, 2023.

Lu, "Brush polymers for nucleic acid delivery and self assembly". Dissertation. Apr. 13, 2017. (Year: 2017).

Lu, H., "Exploring the Structural Diversity of DNA Bottlebrush Polymers Using an Oligonucleotide Macromonomer Approach", Macromolecules, vol. 55, No. 6, 2022, pp. 2235-2242.

Lu, X., et al., "Effective Antisense Gene Regulation via Noncationic, Polyethylene Glycol Brushes", J. Am. Chem. Soc., vol. 138, No. 29, 2016, pp. 9097-9100.

Lu, X., et al., "PEGylation of therapeutic oligonucletides: From linear to highly branched PEG architectures", Nano Research, vol. 11, No. 10, pp. 5519-5534.

Lubbad et al., "Ring-opening metathesis polymerization-derived monolithic anion exchangers for the fast separation of double-stranded DNA fragments," Journal of Chromatography A. 2011. 1218:2362-2367. (Year: 2011).

Lv et al., "Toxicity of cationic lipids and cationic poly1ners in gene delivery," Journal of Controlled Release. 2006. 114:100-109. (Year: 2006).

McLaughlin et al., "Three-Dimensional Organization of Block Copolymers on "DN•• Minimal" Scaffolds," J. Am Chem Soc. 2012. 134:4280-4286. (Year: 2012).

Nair, J.K., et la., "Multivalent N-acetylgalactosamine-conjugated siRNA localizes in hepatocytes and elicits robust RNAi-mediated gene silencing", J. Am. Chem. Soc. 136:16958-16961 (2014).

Neugebauer, D., et al., "Densely-Grafted and Double-Grafted PEO Brushes via ATRP. A Route to Soft Elastomers", Macromolecules 36(18):6746-6755 (2003). Abstract.

Pecot, CV., et al., "RNA interference in the clinic: challenges and future directions", Nat. Rev. Cancer 11(1):59-67 (2011).

Rosi et al., "Oligonucleotide-Modified Gold Nanoparticles for Intracellular Gene Regulation," Science. 2006. 312:1027-.1030 (Year: 2006).

Rozema et al., "Dynamic PolyConjugates for targeted in vivo delivery of siRNA to hepatocytes," PNAS. 2007. 104(32):12982-12987. (Year: 2007).

Sambrook et al., Molecular Cloning: A Laboratory Manual (2nd ed. 1989).

Sato et al., "Polymer brush-stabilized polyplex for a siRNA carrier with long circulatory half-life," Journal of Controlled Release. 2007. 122:209-216. (Year: 2007).

Schnitzler et al.,"DNA Block Copolymers: Functional Materials for Nanoscience and Biomedicine," Accounts of Chemical Research. 2012. 45(9):1419-1430. (Year: 2012).

Senkovskyy et al., "Conductive Polymer Brushes of Regioregular Head-to-Tail Poly(3ualkylthiophenes) via Catalyst-Transfer Surfacea-Initiated Polycondensation," J Am Chem Soc. 2007. 129:6626. (Year: 2007).

Shi et al., "Influence of Histidine Incorporation on Buffer Capacity and Gene Transfection Efficiency of HPMA-co-oligolysine Brush Polymers," Biomacromolecules. 2013. 14:1961-1970. (Year: 2013).

Shim, M.S., and Kwon, Y.J., Efficient and targeted delivery of siRNA in vivo, FEBS J 277 34:4819-4827 (2010).

Tan et al., "Expanding the Materials Space of DNA via Organic-Phase Ring-Opening Metathesis Polymerization," Chem. 2019. 5:1584-1596. (Year: 2019).

Toulme, J-J, et al., "Regulating eukaryotic gene expression with aptamers" FEBS Letters 567:55-62 (2004).

Wakefield et al., "Membrane Activity and Transfection Ability of Amphipathic Polycations as a Function of Alkyl Group Size," Bioconjugate Chem. 2005. 16:1204-1208. (Year: 2005).

Warren, N.J., and Armes, S.P., "Polymerization-Induced Self-Assembly of Block Copolymer Nano-Objects via RAFT Aqueous Dispersion Polymerization", J Am Chem Soc 136(29): 10174-10185 (2014).

Watson et al., "DNA-Block Copolymer Conjugates," J. Am. Chem. Soc. 2001. 123:5592-5593. (Year: 2001).

Winkler., "Oligonudeotide conjugates for therapeutic applications," Ther. Deliv. 2013. 4(7):791-809. (Year: 2013).

Wong et al., "Co-Injection of a Targeted, Reversibly Masked Endosomolytic Polymer Dramatically Improves the Efficacy of Cholesterol-Conjugated Small Interfering RNAs In Vivo," Nucleic Acid Therapeutics. 2012. 22(6):380-390. (Year: 2012).

Xiao et al., "Oligonucleotide-Polymer Conjugates: From Molecular Basics to Practical Application," Topics in Current Chemistry. 2020. 378:24. (Year: 2020).

Yu et al., "Well-Defined Degradable Brush Polymer-Drug Conjugates for Sustained Delivery of Paclitaxel," Mol Pharmaceutics. 2013. 10:867-874. (Year: 2013).

Zhang et al., "Amplified stretch of bottlebrush-coated DNA in nanofluidic channels," Nucleic Acids Research. 2013. 41(20):e189. (Year: 2013).

Zhang et al., "Folate-mediated Cell Uptake of Shell-crosslinked Spheres and Cylinders," J Polym Sci A Polym Chem. 2008. 46(22)7578-7583. (Year: 2008).

Zhang et al., "PEG-Polypeptide Dual Brush Block Copolymers: Synthesis and Application in Nanoparticle Surface PEGylation," ACS Macro Lett. 2013. 2:809-813. (Year: 2013).

Zhang et al., "Well-defined Cationic Shell Crosslinked Nanoparticles for Efficient Delivery of DNA or Peptide Nucleic Acids," Proc Am Thorac soc. 2009. 6:450-457. (Year: 2009).

Zhao., B., and Brittain, W.J., "Polymer brushes: surface immobilized macromolecules", Prog Polym Sci 25:677-710 (2000).

Zheng et al., "A Spherical Nucleic Acid Platform Based on Self-Assembled DNA Biopolymer for High-Performance Cancer Therapy," ACS Nano. 2013. 7(8):6545-6554. (Year: 2013).

Zhou et al., "Aptamer-targeted cell-specific RNA interference," Silence. 2010. 1:4, 10 pages. (Year: 2010).

Zhou et al., "Mechanical Properties of Nanoworm Assembled by DNA and Nanoparticle Conjugates," J Nanosci Nanotechnol. 2016. 16(6):5447-5456. (Year: 2016).

Abraham, Mark James, et al., "GROMACS: High performance molecular simulations through multi-level parallelism from laptops to supercomputers," SoftwareX 1-2 (2015): 19-25.

Akyol, Engin, and Andrew Lotery. "Gene, cell and antibody-based therapies for the treatment of age-related macular degeneration," Biologics: Targets & Therapy 14 (2020): 83.

AndreeBen, B.; Steinbuchel, A., "Serinol: small molecule—big impact," AMB Express 2011, 1(1), 12-12. (2011).

(56) References Cited

OTHER PUBLICATIONS

Aurup, Helle, David M. Williams, and Fritz Eckstein. "2'-Fluoro and 2-amino-2'-deoxynucleoside 5'-triphosphates as substrates for T7 RNA polymerase," Biochemistry 31.40 (1992): 9636-9641.

Bock, Louis C., et al. "Selection of single-stranded DNA molecules that bind and inhibit human thrombin," Nature 355.6360 (1992): 564-566.

Bussi, Giovanni, Davide Donadio, and Michele Parrinello. "Canonical sampling through velocity rescaling." The Journal of Chemical Physics 126.1 (2007): 014101.

Charles, Laurence, and Jean-François Lutz. "Design of a biological digital poly (phosphodiester) s," Accounts of Chemical Research 54.7 (2021): 1791-1800.

Derszniak, Katarzyna, et al. "Comparison of effects of antithrombin aptamers HD1 and HD22 on aggregation of human platelets, thrombin generation, fibrin formation, and thrombus formation under flow conditions," Frontiers in Pharmacology 10 (2019): 68.

Dodda, Leela S., et al. "LigParGen web server: an automatic OPLS-AA parameter generator for organic ligands," Nucleic Acids Research 45.W1 (2017): W331-W336.

Dunn, Matthew R., et al., "Analysis of aptamer discovery and technology," Nature Reviews Chemistry 1.10 (2017): 1-16.

Eder, Paul S., et al. "Substrate specificity and kinetics of degradation of antisense oligonucleotides by a 3' exonuclease in plasma," Antisense Research and Development 1.2 (1991): 141-151.

Ellington, Andrew D., and Jack W. Szostak. "In vitro selection of RNA molecules that bind specific ligands," Nature 346.6287 (1990): 818-822.

Fay, W. P.; et al., "Vitronectin Inhibits the Thrombotic Response to Arterial Injury in Mice," Blood 1999, 93(6), 1825-1830) (1999).

Gao, H.; Matyjaszewski, K., "Synthesis of Molecular Brushes by "Grafting onto" Method: Combination of ATRP and Click Reactions," J. Am. Chem. Soc. 2007, 129 (20), 6633-6639. (2007).

Geng, Zhongmin, et al. "Enhancing anti-PD-1 Immunotherapy by Nanomicelles Self-Assembled from Multivalent Aptamer Drug Conjugates," Angewandte Chemie 133.28 (2021): 15587-15593.

Grunewald, Fabian, et al. "Transferable MARTINI model of poly (ethylene oxide)," The Journal of Physical Chemistry B 122.29 (2018): 7436-7449.

Hakem, Ilhem F., Jyotsana Lal, and Michael R. Bockstaller. "Binding of monovalent ions to PEO in solution: Relevant parameters and structural transitions," Macromolecules 37.22 (2004): 8431-8440.

Hong, Shanni, et al. "A photo-regulated aptamer sensor for spatiotemporally controlled monitoring of ATP in the mitochondria of living cells," Chemical Science 11.3 (2020): 713-720.

Jia, Fei, et al. "Effect of PEG architecture on the hybridization thermodynamics and protein accessibility of PEGylated bligonucleotides," Angewandte Chemie 129.5 (2017): 1259-1263.

Jorgensen, William L., et al., "Development and testing of the OPLS all-atom force field on conformational energetics and properties of organic liquids," Journal of the American Chemical Society 118.45 (1996): 11225-11236.

Juliano, R. L., et al. "Cellular uptake and intracellular trafficking of oligonucleotides: implications for oligonucleotide pharmacology," Nucleic Acid Therapeutics 24.2 (2014): 101-113.

Kanehisa, M., "Use of statistical criteria for screening potential homologies in nucleic acid sequences," Nucleic Acids Res. 12:203 (1984).

Kashida, Hiromu, et al. "Control of the chirality and helicity of oligomers of serinol nucleic acid (SNA) by sequence design," Angewandte Chemie 123.6 (2011): 1321-1324.

Keefe, Anthony D., Supriya Pai, and Andrew Ellington. "Aptamers as therapeutics." Nature Reviews Drug Discovery 9.7 (2010): 537-550.

Klußmann, Sven, et al. "Mirror-image RNA that binds D-adenosine," Nature Biotechnology 14.9 (1996): 1112-1115.

Kovacevic, Katarina D., et al., "Pharmacokinetics, pharmacodynamics and safety of aptamers," Advanced Drug Delivery Reviews 134 (2018): 36-50.

Kretz, Colin A., et al. "HD1, a thrombin-directed aptamer, binds exosite 1 on prothrombin with high affinity and inhibits its activation by prothrombinase," Journal of Biological Chemistry 281.49 (2006): 37477-37485.

Lacroix, Aurelie, and Hanadi F. Sleiman. "DNA nanostructures: current challenges and opportunities for cellular delivery," ACS Nano 15.3 (2021): 3631-3645.

Lao, Yeh-Hsing, et al., "Aptamer nanomedicine for cancer therapeutics: barriers and potential for translation," ACS Nano 9.3 (2015): 2235-2254.

Love, Jennifer A., et al. "A practical and highly active ruthenium-based catalyst that effects the cross metathesis of acrylonitrile," Angewandte Chemie 114.21 (2002): 4207-4209.

Lu et al., "Providing Oligonucleotides with Steric Selectivity by Brush-Polymer-Assisted Compaction," J Am Chem Soc Epub Sep. 17, 2015 vol. 137 No. 39 pp. 12466-12469. entire article.

Lu et al., "Effective Antisense Gene Regulation via Noncationic, Polyethylene Glycol Brushes," Journal of The American Chem. Soc., 2016, 138: 9097-9100 (Year: 2016).

Magarkar, Aniket, et al. "Molecular dynamics simulation of PEGylated bilayer interacting with salt ions: a model of the liposome surface in the bloodstream," The Journal of Physical Chemistry B 116.14 (2012): 4212-4219.

Marrink, Siewert J., et al. "The MARTINI force field: coarse grained model for biomolecular simulations," The Journal of Physical Chemistry B 111.27 (2007): 7812-7824.

Needleman, Saul B., and Christian D. Wunsch. "A general method applicable to the search for similarities in the amino acid sequence of two proteins," Journal of molecular biology 48.3 (1970): 443-453.

Ng, Eugene WM, et al. "Pegaptanib, a targeted anti-VEGF aptamer for ocular vascular disease," Nature Reviews Drug Discovery 5.2 (2006): 123-132.

Ni, Shuaijian, et al. "Recent progress in aptamer discoveries and modifications for therapeutic applications," ACS Applied Materials & Interfaces 13.8 (2020): 9500-9519.

Paborsky, Lisa R., et al. "The single-stranded DNA aptamer-binding site of human thrombin," Journal of Biological Chemistry 268, 28 (1993): 20808-20811.

Parrinello, Michele, and Aneesur Rahman. "Polymorphic transitions in single crystals: A new molecular dynamics method," Journal of Applied Physics 52.12 (1981): 7182-7190.

Pearce, Amanda K., and Rachel K. O'Reilly. "Polymers for biomedical applications: the importance of hydrophobicity in directing biological interactions and application efficacy," Biomacromolecules 22.11 (2021): 4459-4469.

Pearson & Lipman, "Improved tools for biological sequence comparison," Proc. Natl. Acad. Sci. USA 85:2444-2448 (1988).

Pontrello, Jason K., et al. "Solid-phase synthesis of polymers using the ring-opening metathesis polymerization," Journal of the American Chemical Society 127.42 (2005): 14536-14537.

Riccardi, Claudia, et al. "G-quadruplex-based aptamers targeting human thrombin: Discovery, chemical modifications and antithrombotic effects," Pharmacology & Therapeutics 217 (2021): 107649.

Roloff, Alexander, et al. "Micellar thrombin-binding aptamers: reversible nanoscale anticoagulants," Journal of the American Chemical Society 139.46 (2017).

Rusconi, Christopher P., et al. "Antidote-mediated control of an anticoagulant aptamer in vivo," Nature Biotechnology 22.11 (2004): 1423-1428.

Rusconi, Christopher P., et al. "RNA aptamers as reversible antagonists of coagulation factor Ixa," Nature 419.6902 (2002): 90-94.

Schrlau, Michael G., et al., "Cell electrophysiology with carbon nanopipettes," ACS Nano 3.3 (2009): 563-568.

Smith & Waterman, "Comparison of Biosequences," Adv. Appl. Math. 2:482-489 (1981).

Su, Chan-Fei, et al. "Nanoparticles of various degrees of hydrophobicity interacting with lipid membranes," The Journal of Physical Chemistry Letters 8.17 (2017): 4069-4076.

Sykes, Edward A., et al. "Nanoparticle exposure in animals can be visualized in the skin and analysed via skin biopsy," Nature Communications 5.1 (2014): 1-8.

(56) References Cited

OTHER PUBLICATIONS

Tao, Xiaoqi, et al. "Conjugation of antibodies and aptamers on nanozymes for developing biosensors," Biosensors and Bioelectronics 168 (2020): 112537.
Tuerk, Craig, and Larry Gold. "Systematic evolution of ligands by exponential enlichment: RNA ligands to bacteriophage T4 DNA polymerase," Science 249.4968 (1990): 505-510.
Uusitalo, Jaakko J., et al. "Martini coarse-grained force field: extension to DNA," Journal of Chemical Theory and Computation 11.8 (2015): 3932-3945.
Vater, Axel, and Sven Klussmann. "Turning mirror-image oligonucleotides into drugs: the evolution of Spiegelmer® therapeutics," Drug Discovery Today 20.1 (2015): 147-155.
Wang, D.; et al., "Bottlebrush-architectured poly(ethylene glycol) as an efficient vector for RNA interference in vivo," Sci. Adv. 2019, 5 (2), eaav9322. (2019).
Wang, Dali, et al. "Targeting oncogenic KRAS with molecular brush-conjugated antisense oligonucleotides," Proceedings of the National Academy of Sciences 119.29 (2022): e2113180119.
Wu, Lingling, et al. "Aptamer-based detection of circulating targets for precision medicine," Chemical Reviews 121.19 (2021): 12035-12105.
Yu, D.; et al., "Cellular penetration and localization of polyethylene glycol," Cancer Res. 2004, 64, 149-149. (2004).
Zhao, Shuai, et al., "A DNA origami-based aptamer nanoarray for potent and reversible anticoagulation in hemodialysis," Nature Communications 12.1 (2021).
Zhou, J.; Rossi, J., "Aptamers as targeted therapeutics: current potential and challenges," Nature reviews. Drug discovery 2017, 16 (3), 181-202. (2017).
International Search Report and Written Opinion for International Application No. PCT/US2020/027026 mailed on Nov. 24, 2020, 17 pages.
Li et al., "Well-Defined DNA-Polymer Miktoarm Stars for Enzyme-Resistant Nanoflares and Carrier-Free Gene Regulation", Bioconjugate Chemistry, vol. 31, No. 3, Feb. 10, 2020, pp. 530-536.
Unpublished U.S. Appl. No. 19/195,709, entitled: "Targeting Skin-Related Conditions Using Bottlebrush Polymer-Conjugated Oligonucleotides," Inventor: Yang Fang, filed Apr. 30, 2025., U.S. Appl. No. 19/195,709.

\* cited by examiner

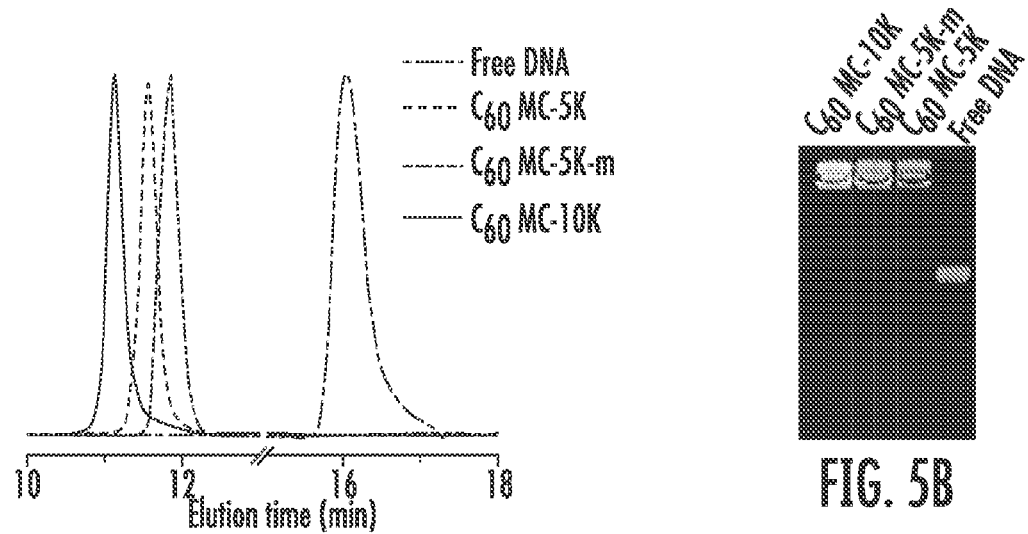
FIG. 5A
FIG. 5B
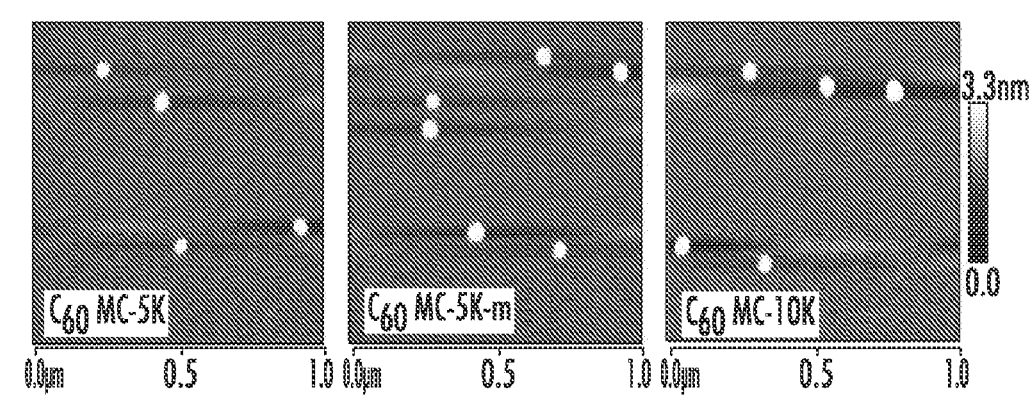
FIG. 5C
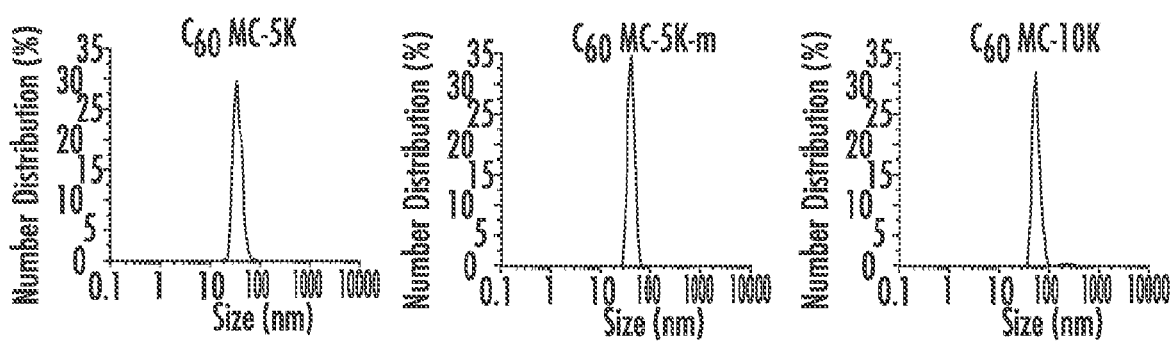
FIG. 5D

OLIGONUCLEOTIDE-POLYMER MIKTOARM CONJUGATES AND METHODS OF USE

CROSS REFERENCE TO RELATED APPLICATIONS

This application is a national phase filing under 35 U.S.C. § 371 claiming the benefit of and priority to International Patent Application No. PCT/US2020/027026, filed on Apr. 7, 2020, which claims the benefit of priority under 35 U.S.C. § 119 to U.S. Provisional Patent Application No. 62/382,317 by Zhang, filed Apr. 11, 2019, the entire disclosure of which is incorporated herein by reference thereto.

STATEMENT OF GOVERNMENT INTEREST

This invention was made with government support under Grant Number GM121612 awarded by the National Institutes of Health. The government has certain rights in the invention.

INCORPORATION BY REFERENCE OF MATERIAL IN ASCII TEXT FILE

This application incorporates by reference the Sequence Listing contained in the following ASCII text file being submitted concurrently herewith:
 a) File name: 8190_0104Z_SL.txt; created Oct. 8, 2021, 4,508 Bytes in size.

FIELD OF THE INVENTION

The disclosure provides a polymer-oligonucleotide nanoconjugate of a well-defined molecular structure (termed miktoarm conjugate). Each conjugate bears precisely one, two, three, four or five oligonucleotides and a predetermined number of polymer chains, e.g., five to fifty chains). The oligonucleotide and polymer chains are connected to a central core, which can be linear (for example, a polymer backbone) or non-linear (for example, a multivalent spherical core). These nanoconjugates create a higher-density local polymer environment compared with linear or slightly branched polymer-DNA conjugates. The increased polymer density provides the oligonucleotide with steric selectivity, allowing it to resist protein access (for example, nuclease digestion) while remaining capable of hybridizing with a complementary sequence. Importantly, the conjugates improve cellular uptake and regulate gene expression as a single-entity antisense agent without the need for complexation with a transfection carrier.

BACKGROUND OF THE INVENTION

Oligonucleotides are a promising class of agents in the fight against a wide variety of diseases including cancers, neuropathies, and metabolic disorders. Despite decades of research, however, widespread clinical success in the therapeutic use of oligonucleotides has yet to be realized, in part due to the biopharmaceutical difficulties intrinsic to nucleic acids, such as rapid body clearance, poor enzymatic stability, low cellular uptake, limited biochemical efficacy, and an abundance of off-target effects. Chemically modified oligonucleotides, such as phosphorothioates and morpholinos, have been developed to circumvent some of these challenges, which resulted in several drugs reaching the market in the US to date. However, a high dosage requirement (and therefore cost), difficulty in delivery to non-liver sites, and potential liver/cardiovascular toxicity remain challenges. At the same time, a range of synthetic transport vectors (cationic polymers, biological entities, nanoparticles, liposomes, etc.) have been developed to facilitate oligonucleotide delivery. While varying levels of laboratory success have been achieved, other than liposomes, none of these vector systems have received regulatory approval due to a range of issues such as carrier-induced toxicity/immunogenicity, inconsistency in formulation, and limited benefit. Therefore, a safe and effective oligonucleotide construct that can be systemically used is still very much desired.

SUMMARY OF THE INVENTION

In one aspect of the invention there is provided a polymer-oligonucleotide nanoconjugate of a well-defined molecular structure, referred to herein as a miktoarm conjugate. In certain embodiments the miktoarm conjugate comprises a backbone; a predetermined number of from 5 to 50 polymer arms covalently linked to the backbone; and a predetermined number of from 1 to 10 oligonucleotides covalently linked to the backbone, wherein each of the oligonucleotides is sufficiently complementary to a target polynucleotide to hybridize to the target polynucleotide or can bind to a non-nucleic acid target under predetermined conditions. In certain embodiments the polymer arms are poly(ethylene glycol). In certain embodiments, the polymer arms are each 3 kDa to 30 kDa.

In certain embodiments, the polymer arms are substantially identical.

In certain embodiments, the oligonucleotide is single-stranded DNA, double-stranded DNA, single-stranded RNA, double-stranded RNA, aptamers, ribozymes, DNAzymes, antisense oligonucleotides, exon-skipping oligonucleotides, siRNA oligonucleotides, triple helix forming oligonucleotides, chemically modified forms thereof, or a combination thereof.

In certain embodiments, the polymer arms of the miktoarm conjugate have a length and density sufficient to protect the 1 to 10 oligonucleotides via steric hindrance.

In certain embodiments, the backbone of the miktoarm conjugate is linear, 2-dimensional, or 3-dimensional. The backbone may be selected from nanoparticles, synthetic polymers, natural biopolymers, or modified forms of biopolymers. In any of the above embodiments, the oligonucleotides may comprise from 8 to 30 bases each.

In certain embodiments, each of the 1 to 10 oligonucleotides is independently conjugated to the backbone at the 5' or 3' end of the oligonucleotide or attached via a non-terminal site within the sequence of the oligonucleotide, such as at or near the middle of the sequence. The oligonucleotides may be conjugated to the backbone via a cleavable bond and may be of different lengths and/or have different sequences or may be identical.

In another aspect of the invention, there is provided a method of modulating or altering the expression of a gene product encoded by a target polynucleotide comprising contacting the target polynucleotide with a miktoarm conjugate of any of the embodiments above, wherein said contacting occurs in the absence of a transfection vector.

In yet another aspect of the invention, there is provided a method for promoting cellular uptake of an oligonucleotide by a target cell, comprising contacting the target cell with a miktoarm conjugate as described for any of the embodiments above, wherein said cellular uptake occurs in the absence of a transfection vector. In certain embodiments of this aspect, the backbone is hydrophobic. In certain embodiments, the target cell is eukaryotic or prokaryotic.

In another aspect of the invention, there is provided a method of detecting the presence of a target polynucleotide in a subject or a biological sample obtained from a subject, comprising contacting the target polynucleotide with the miktoarm conjugate of any of the embodiments of the first aspect of the invention, wherein said contacting occurs in the absence of a transfection vector. In certain embodiments of this aspect, at least one of the 1 to 10 oligonucleotides of the miktoarm conjugate is hybridized to a complementary sequence that is tethered to a fluorescence quencher. In certain embodiments, the quencher is a small molecule or a nanoparticle. In certain embodiments, the hybridization is partial, leaving an unhybridized overhang that can hybridize to a target polynucleotide, which peels off the miktoarm conjugate or the quencher by forming a full hybridization. In certain embodiments of this aspect, the target polynucleotide is selected from eukaryotic, prokaryotic, and viral polynucleotides. In particular, the target polynucleotide may be a polynucleotide specific to a mammalian cancer cell, a non-cancer mammalian cell, a plant cell, a bacterium, or a virus.

In a further aspect, a composition comprising the miktoarm conjugate of any one of the embodiments disclosed herein is provided.

In another aspect of the invention, there is provided a method of synthesizing a miktoarm conjugate by sequentially coupling oligonucleotide and polymer side chains to a multivalent core, said method comprising the steps of:
(1) synthesizing a plurality of multivalent core molecules;
(2) conjugating said multivalent core molecules to oligonucleotide strands and polymer arms to form a mixture containing a miktoarm conjugate; and
(3) separating the miktoarm conjugate from the mixture of step (2);
wherein the polymer arms and the oligonucleotides are conjugated to the multivalent core molecules via separate reactions.

In yet another aspect of the invention, there is provided a method of synthesizing a miktoarm conjugate comprising the steps of:
(1) synthesizing a tri-segment sequence comprising a first segment comprising a first oligonucleotide sequence covalently linked to the 5' end of a second segment comprising a plurality of hydrophobic repeating nucleotide units, said second segment covalently linked at the 3' end thereof to a third segment comprising a second oligonucleotide sequence, wherein the repeating nucleotide units in the second segment each comprise one amine group,
(2) purifying the tri-segment sequence;
(3) partially derivatizing the triblock sequence with PEG or other non-biofouling polymers bearing a terminal reactive ester in an aqueous buffer, followed by drying, and further derivatization in dry dimethylformamide for a sufficient period of time to ensure quantitative grafting; and
(4) purifying the triblock sequence of step (3);
wherein said method is carried out in the absence of a heavy metal catalyst.

In certain embodiments of this aspect, the resulting miktoarm conjugate has a linear backbone. In certain aspects, the first and second oligonucleotide sequences are identical or may be different from one another. In certain embodiments, the second segment of the triblock sequence comprises from 5-50 repeating nucleotide units. In certain embodiments, the repeating nucleotide units are chemically modified.

BRIEF DESCRIPTION OF THE DRAWINGS

FIGS. 5A-5D are characterizations of $C_{60}$ MCs. 5A and 5B) Aqueous GPC and agarose gel electrophoresis (1%) of purified MCs and free DNA. 5C) AFM of pacDNAs on freshly cleaved mica surface. 5D) Number-average hydrodynamic size distribution of pacDNAs in phosphate buffered saline (pH=7.4).

DETAILED DESCRIPTION OF THE INVENTION

Figure 1:
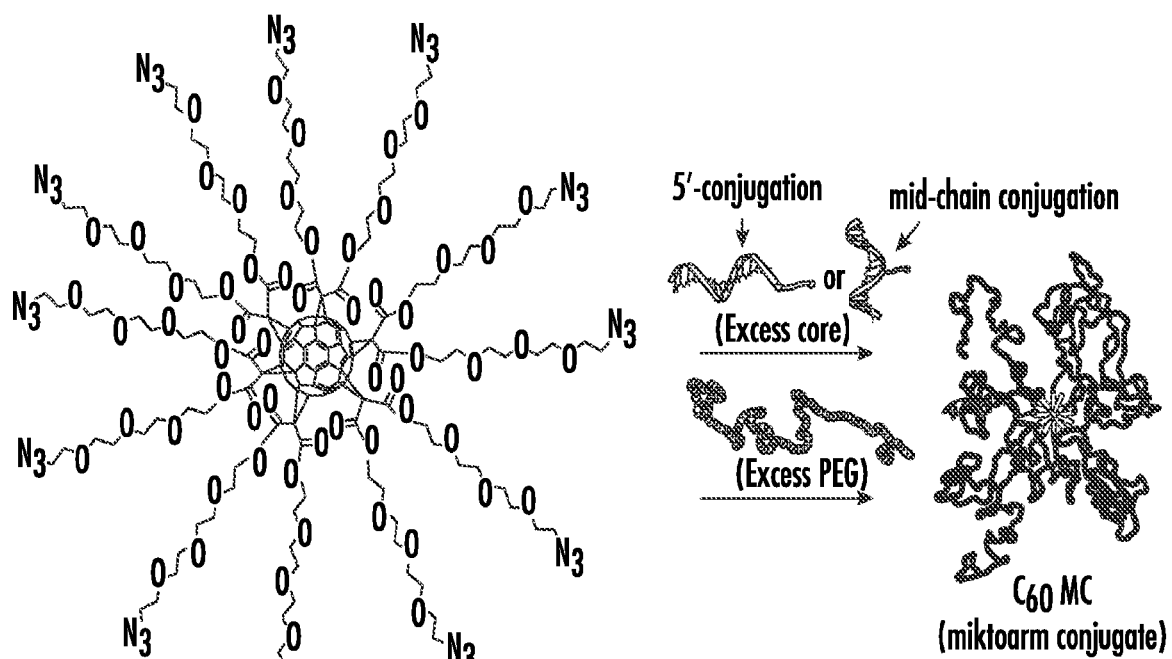
FIG. 1 shows the schematics for synthesizing fullerene $C_{60}$-based miktoarm conjugates of the invention.

Recently, we reported a non-cationic, brush-architectured poly(ethylene glycol) (PEG)-DNA conjugate, termed pacDNA (polymer-assisted compaction of DNA), as a novel form of therapeutic oligonucleotide agent (US 2018/0230467, incorporated herein by reference). Consisting of ~30 PEG side chains and 2-5 strands of oligonucleotide attached to a central polynorbornene backbone, the pacDNA imparts the imbedded oligonucleotide strands with steric selectivity: access by various proteins is reduced but hybridization with a complementary sequence is nearly unaffected both kinetically and thermodynamically. This property significantly reduces the potential for non-hybridization side effects caused by protein-nucleic acid interactions. The bottlebrush structure also enhances the oligonucleotide bioactivity in vitro and in vivo by elevating nuclease stability, accelerating cellular uptake, and promoting blood circulation times and tumor targeting. In a side-by-side comparison with phosphorothioates, the brush conjugate is at least an order of magnitude greater in blood availability and tumor concentration (in a subcutaneous xenograft mouse model) and is free of common deleterious side effects such as acute toxicity, inflammation, and coagulopathy. Importantly, the pacDNA consists predominantly of PEG, a generally safe agent for pharmaceutical use, making it highly translatable.

The pacDNA structures synthesized thus far are inherently polydisperse due to the use of ring-opening metathesis polymerization (ROMP) in the construction of the brush backbone, which may obscure subsequent physiochemical and biological investigations that concern molecular size and DNA density. In addition, trace amounts of the Ru catalyst used in ROMP may eventually prove to be a point of concern, should these materials move forward in clinical studies.

This disclosure provides a strategy to replicate the properties of brush polymer-based pacDNA in a molecularly well-defined form, i.e., a monodisperse structure with precise numbers of polymer side chains (e.g., PEG) and oligonucleotides (e.g., DNA chains), without the use of a metal catalyst. Every miktoarm conjugate in a batch synthesis has the same or substantially the same molecular weight (MW). The present miktoarm conjugates exhibit prototypical pacDNA properties, including resistance to nuclease degradation, improved pharmacokinetics, reduced immune system activation, and the ability to regulate gene expression without a co-carrier, but are a more molecularly pure, biocompatible form of pacDNA (See US 2018/0230467, incorporated herein by reference). The mikoarm conjugates also exhibit improved cellular uptake, which is related to the hydrophobicity of the backbone (or core) and/or linkers. The terms "backbone" and "core" are used interchangeably throughout this disclosure. As used herein the terms mean the central core, which can be linear (for example, a polymer backbone) or non-linear (for example, a multivalent spherical core) to which the oligonucleotide and polymer chains, for example are connected.

As used herein the term "natural biopolymer" refers to any polymeric chemical manufactured by a living organism, such as proteins, oligonucleotides, and polysaccharides. "Synthetic biopolymers" are those polymeric chemicals prepared by laboratory synthesis.

To achieve such a precision miktoarm structure, we designed and demonstrated a full convergent synthesis and a combined divergent/convergent synthesis. For the full convergent synthesis, one or more oligonucleotides and polymer (e.g., PEG) strands are separately attached to a multivalent backbone, such as a nanoparticle, synthetic polymer, natural biopolymer (oligonucleotide, peptide, polysaccharide, etc), or modified forms of biopolymers (Scheme 1) (FIG. 1). For the combined divergent/convergent synthesis, the oligonucleotide and the backbone are synthesized sequentially using automated synthesis, purified, and then conjugated to polymer (e.g. PEG) strands. The term "modified" as used herein refers to any deviation in the chemical structure from the natural biopolymer, for e.g. an oligonucleotide comprising at least one modified internucleoside linkage, a modified sugar, and/or a modified nucleobase; a peptide containing at least one unnatural amino acid or unnatural peptide linkage; a polysaccharide with at least one unnatural monosaccharide unit or glycosidic linkage. The backbone is relatively compact but not overwhelmingly small (for example 3-20 nm, 4-8 nm, preferably 5-10 nm, or ~5 nm, assuming all bonds in the linker are in a fully stretched conformation), making it possible to fully derivatize the backbone and at the same time reach a high polymer side chain density. The backbone may be linear, two-dimensional, or three-dimensional, such as spherical for example. The backbone is sufficiently hydrophobic to improve interaction with cellular membrane, cellular uptake, access to cytosolic space, and antisense efficiency.

Each backbone has a predetermined number of polymer side chains (also referred to as "polymer arms" herein) and oligonucleotides attached, e.g., a predetermined amount selected from 5-50 polymer side chains and from 1-10 oligonucleotides. Miktoarm conjugates are contemplated that contain 5-50 polymer side chains, e.g., 11 polymer side chains and a single oligonucleotide, miktoarm conjugates that contain 5-50 polymer side chains and 2 oligonucleotides, miktoarm conjugates that contain 5-50 polymer side chains and 3 oligonucleotides, miktoarm conjugates that have 5-50 polymer side chains and 4 oligonucleotides, miktoarm conjugates that contain 5-50 polymer side chains and 5 oligonucleotides, miktoarm conjugates that contain 5-50 polymer side chains and 6 oligonucleotides, miktoarm conjugates that contain 5-50 polymer side chains and 7 oligonucleotides, miktoarm conjugates that contain 5-50 polymer side chains and 8 oligonucleotides, miktoarm conjugates that contain 5-50 polymer side chains and 9 oligonucleotides, and miktoarm conjugates that have 5-50 polymer side chains and 10 oligonucleotides. In each of these embodiments, the oligonucleotides may be the same or different. In preferred embodiments the polymer side chains are PEG.

The polymer side chains are tethered to the backbone in close proximity to one another. The side chains can be a homopolymer or a copolymer and can be the same or different from one another. Any biocompatible non-cationic polymer that does not interact strongly with proteins (e.g., exhibits stealth properties which enable it to avoid recognition by immune cells, liver receptors, and other proteins) can be used to generate the polymer component of the miktoarm conjugates. For example, PEG may be used, as well as polysaccharides such as amylose and hyaluronic acid, and zwitterion polymers such as poly(methacryloyl-L-lysine), poly(sulfobetaine methacrylate), and poly(carboxybetaine methacrylate). In preferred embodiments, the side chains are PEG.

The length of the polymer side chains is selected to provide sufficient protection of the oligonucleotides that are bound to the backbone of the miktoarm conjugate. The length of the side chains is decreased or increased to accommodate the size of the oligonucleotide component. As a general principal, the longer the oligonucleotide, the longer the length of the side chains. In general, the side chains are longer (in their coiled state) than the length of the oligonucleotide component. The length of the oligonucleotide component is measured from the point of its attachment to the backbone of the miktoarm conjugate. That is, if the oligonucleotide is attached to the backbone from its 5' or 3' end, the length of the side chains should be sufficient to protect the entire length of the oligonucleotide. On the other hand, if the oligonucleotide is attached to the miktoarm conjugate backbone from an internal position of the oligonucleotide sequence, then the length of the side chains need only be as long as or slightly longer than the longest end of the attached oligonucleotide. For example, if a 30-nucleotide strand is attached to backbone via an internal T base located at nucleotide 20, then the side chains should be of sufficient length to provide protection for a 20 nucleotide-long strand.

The density of the polymer side chains affects the protective properties of the miktoarm conjugate. The side chains should be dense enough to create steric congestion, requiring that the structure has sufficiently high degrees of polyvalency at the backbone. Owing to advances in automated solid-phase synthesis and bioconjugation chemistries, as well as other polymerization methodologies, control over this parameter, as well as the size of the backbone and length of polymer side chains, is easily accomplished. (Lu et al., J. Am. Chem. Soc., 2012, 134, 16337; Zhang et al., J. ACS Macro lets., 2013, 2, 809; Gutekunst et al., J. Am. Chem. Soc., 2015, 137, 8038; Jia et al., Chem. Commun., 2015, 71, 7843). In general, the miktoarm conjugates contain from 5-50, 15-40, 20-35 polymer side chains, while each conjugate prepared in any batch synthesis contains a predetermined number of polymer side chains.

The oligonucleotide component of the miktoarm conjugate can be single/double stranded DNA, or single/double stranded RNA. The oligonucleotides can be natural or chemically modified. Oligonucleotides contemplated for attachment to the backbone of the miktoarm conjugates include those which modulate or alter the expression of a gene product expressed by a target polynucleotide, or those which bind to an extracellular/intracellular non-polynucleotide target, or those which are capable of performing a specific chemical reaction (often but not always catalytic). Accordingly, antisense oligonucleotides which hybridize to a target polynucleotide and inhibit translation, exon-skipping oligonucleotides which binds to pre-mRNA to cause certain exons to be skipped, siRNA oligonucleotides which hybridize to a target polynucleotide and initiate an RNase activity (for example RNase H), triple helix forming oligonucleotides which hybridize to double-stranded polynucleotides and inhibit transcription, aptamers which bind to pre-selected molecular target, and ribozymes or DNAzymes which carry out specific chemical reactions, are contemplated.

In general, the oligonucleotide component of the miktoarm conjugate range from 8 to 30 nucleotides long and all oligonucleotides intermediate in length of the sizes specifically disclosed to the extent that the oligonucleotide is able to achieve the desired result. Accordingly, oligonucleotides of 8, 9, 10, 11, 12, 13, 14, 15, 16, 17, 18, 19, 20, 21, 22, 23, 24, 25, 26, 27, 28, 29, and 30, nucleotides in length are contemplated.

In certain embodiments, a detectable label may be incorporated at either end of the oligonucleotide to facilitate tracking and quantification of the miktoarm conjugate. The oligonucleotides may be naturally occurring nucleic acids or may be synthetically derived or may be chemically modified.

Conjugation of the oligonucleotides to the backbone via a 5' linkage, 3' linkage, or via an internal position as disclosed herein provides miktoarm conjugates containing a one or a plurality of oligonucleotides. The number of conjugated oligonucleotides can be adjusted by manipulating the structure of the backbone. For example, miktoarm conjugates containing 1, 2, 3, 4, 5, 6, 7, 8, 9, or 10 [or more] oligonucleotides, which may be the same or different, can be achieved.

In other embodiments, methods and compositions are provided wherein the oligonucleotide is bound to the backbone in such a way that the oligonucleotide is released from the backbone after the miktoarm conjugate reaches a certain location (for example inside a cell). In general an oligonucleotide can be released from the backbone using either biochemical methods, photocleavage (i.e., irradiating cells in which miktoarm conjugates have entered using an electromagnetic wavelength chosen based on the photocleavage chemistry), changes in ionic or acid/base environment, or changes in biological redox states, for example.

Oligonucleotides contemplated for use in the methods disclosed herein include those bound to the backbone of the miktoarm conjugate through any means. Regardless of the means by which the oligonucleotide is attached to the backbone, attachment in various aspects is effected through a 5' linkage, a 3' linkage, some type of internal linkage, or any combination of these attachments. For example, oligonucleotides or a subset of oligonucleotides in any particular miktoarm conjugate can be covalently attached at their 5' end to the backbone. In another example, one oligonucleotide strand is attached to the backbone at its 5' end while a second oligonucleotide is attached at its 3' end.

Each miktoarm conjugate utilized in the compositions and methods provided herein has a predetermined number of oligonucleotides attached to the backbone, e.g., 5 oligonucleotides. As a result, there is provided a substantially molecularly pure, more biocompatible form of oligonucleotide conjugate for delivery of oligonucleotides to cells. Each miktoarm conjugate has the ability to bind to (hybridize with) one or more target polynucleotides having a sufficiently complementary sequence. For example, if a specific mRNA is targeted, a single miktoarm conjugate has the ability to hybridize with multiple copies of the same transcript. In one embodiment, methods are provided wherein the miktoarm conjugate is functionalized with 2, 3, 4, or 5 identical oligonucleotides, i.e., each oligonucleotide has the same length and the same sequence. In other embodiments, the miktoarm conjugate is functionalized with 2, 3, 4, or 5 oligonucleotides, which are not identical, i.e., at least one of the attached oligonucleotides differs from at least one other attached oligonucleotide in that it has a different length and/or a different sequence or modification.

In embodiments wherein different oligonucleotides are attached to the backbone, these different oligonucleotides hybridize with the same single target polynucleotide, but at different locations, or hybridize with different target polynucleotides which encode different gene products. Accordingly, in various aspects of the invention, a single functionalized miktoarm conjugate may be used to inhibit expression of more than one gene product. Oligonucleotides are thus used to target specific polynucleotides, whether at one or more specific regions in the target polynucleotide, or over the entire length of the target polynucleotide as the need may be to cause a desired level of inhibition of gene expression.

"Hybridize" and "hybridization" mean an interaction between two strands of nucleic acids by hydrogen bonds in accordance with the rules of Watson-Crick DNA complementarity, Hoogstein binding, or other sequence-specific binding known in the art. Hybridization can be performed under different stringency conditions known in the art.

Under appropriate stringency conditions, hybridization between the two complementary strands could reach about 60% or above, about 70% or above, about 80% or above, about 90% or above, about 95% or above, about 96% or above, about 97% or above, about 98% or above, or about 99% or above in the reactions. It will be understood by those of skill in the art that the degree of hybridization is less significant in the disclosed technology than a resulting degree of inhibition of gene product expression.

The oligonucleotides used in the miktoarm conjugates are designed with knowledge of the target sequence or sequences. Methods of making oligonucleotides of a predetermined sequence are well-known. See, for example, Sambrook et al., Molecular Cloning: A Laboratory Manual (2nd ed. 1989) and F. Eckstein (ed.) Oligonucleotides and Analogues, 1st Ed. (Oxford University Press, New York, 1991). Solid-phase synthesis methods are contemplated for both oligoribonucleotides and oligodeoxyribonucleotides (the well-known methods of synthesizing DNA are also useful for synthesizing RNA). Oligoribonucleotides and oligodeoxyribonucleotides can also be prepared enzymatically.

Alternatively, oligonucleotides are selected from a library. Preparation of libraries of this type is well known in the art. See, for example, Oligonucleotide Libraries: U.S. patent application No. 20050214782, published Sep. 29, 2005.

In various aspects of the invention, the target polynucleotide is either eukaryotic, prokaryotic, or viral. In various embodiments, the target polynucleotide is an mRNA encoding a gene product and translation of the gene product is inhibited by the miktoarm conjugate, or the target polynucleotide is a pre-mRNA and processing of the pre-mRNA to mRNA is altered, or the target polynucleotide is DNA in a gene encoding a gene product and transcription of the gene product is inhibited, or the target polynucleotide is a viral RNA or DNA and the viral genome transcription, translation, or replication is hindered. The target polynucleotide may be a DNA that encodes a gene product being inhibited or may be complementary to a coding or non-coding region for a gene product. In still other embodiments, the target DNA encodes a regulatory element necessary for expression of a gene product. "Regulatory elements" include, but are not limited to enhancers, promoters, silencers, polyadenylation signals, regulatory protein binding elements, regulatory introns, ribosome entry sites, and the like. In still other embodiments, the target polynucleotide is a sequence which is required for endogenous replication.

Target regions within a target polynucleotide include any portion of the target nucleic acid, such as the 5' untranslated region (5'UTR) of a gene, the portion of an mRNA in the 5' direction from the translation initiation codon, including nucleotides between the 5' cap site and the translation initiation codon of an mRNA (or corresponding nucleotides on the gene), and the 3' untranslated region (3'UTR), the portion of an mRNA in the 3' direction from the translation termination codon, including nucleotides between the translation termination codon and 3' end of an mRNA (or corresponding nucleotides on the gene).

In some embodiments of the various aspects of the invention, the target nucleic acid is a gene or RNA transcript specific to a cancer cell or which is dependent by cancer cells, such as KRAS, for example, which is dependent by several types of cancers, such as non-small cell lung carcinoma and pancreatic ductal adenocarcinoma.

For prokaryotic target polynucleotides, the polynucleotide is genomic DNA or RNA. For eukaryotic target polynucleotides, the polynucleotide is an animal polynucleotide, a plant polynucleotide, or fungal polynucleotide, including yeast polynucleotides. The target polynucleotide is either a genomic DNA or RNA. In certain embodiments, the target polynucleotide is a mitochondrial polynucleotide. For viral target polynucleotides, the polynucleotide is viral genomic RNA or transcribed RNA or viral genomic DNA.

Accordingly, the miktoarm conjugates described herein may be used to diagnose, prevent, treat, or manage certain diseases or bodily conditions. In some cases, the miktoarm conjugates are both a therapeutic agent and a diagnostic agent. Therapeutic methods provided herein embrace those which result in essentially any degree of inhibition of expression of a target gene product, or any degree of altering of a target gene product.

The miktoarm conjugates are preferably biodegradable and/or biocompatible. The term "biodegradable" is defined by the American Society for Testing and Materials as degradation caused by biological activity, especially by enzymatic action, leading to a significant change in the chemical structure of the material. For purposes herein, a material is biodegradable if it undergoes 60% biodegradation within 180 days in accordance with ASTM D6400.

In some embodiments, miktoarm conjugates described herein may be used as intracellular diagnostic agents. The ability to deliver nucleic acids intact to the cell cytoplasm provides an opportunity to not only regulate RNA targets, but also to detect them. For instance, in some embodiments, delivery of a miktoarm conjugate having 3' and/or 5' detectable markers is used to detect the presence of target RNA. In other embodiments, the mikotarm conjugates may be designed with oligonucleotides to detect the presence of intracellular/extracellular proteins (e.g., aptamers) or small molecules through changes in fluorescence that occur due to target protein or small molecule binding, respectively. The miktoarm conjugates described herein may be made to deliver nucleic acid sensors for a broad range of biomolecules that provide a convenient readout of their presence, for example, through increased or decreased fluorescence upon target molecule binding.

The inventive miktoarm conjugates may be used in "pharmaceutical compositions" or "pharmaceutically acceptable" compositions, which comprise a therapeutically effective amount of one or more of the conjugates described herein, formulated together with one or more pharmaceutically acceptable carriers, additives, and/or diluents. The pharmaceutical compositions described herein may be useful for diagnosing, preventing, treating, or managing a disease or bodily condition such as cancer or bacterial or viral infection, for example. It should be understood that any miktoarm conjugates described herein can be used in such pharmaceutical compositions.

Pharmaceutical compositions containing the miktoarm conjugates may be specially formulated for administration in solid or liquid form, including those adapted for oral administration, for example, drenches (aqueous or non-aqueous solutions or suspensions), tablets, e.g., those targeted for buccal, sublingual, and systemic absorption, boluses, powders, granules, pastes for application to the tongue; parenteral administration, for example, by subcutaneous, intramuscular, intravenous or epidural injection as, for example, a sterile solution or suspension, or sustained-release formulation; topical application, for example, as a cream, ointment, or a controlled-release patch or spray applied to the skin, lungs, or oral cavity; intravaginally or intrarectally, for example, as a pessary, cream or foam; sublingually; ocularly; transdermally; or nasally, pulmonary and to other mucosal surfaces.

As used herein, the term "pharmaceutically acceptable" refers to those structures, materials, compositions, and/or dosage forms which are, within the scope of sound medical judgment, suitable for use in contact with the tissues of human beings and animals without excessive toxicity, irritation, allergic response, or other problems or complication, commensurate with a reasonable benefit/risk ratio.

The phrase "pharmaceutically-acceptable carrier" as used herein means a pharmaceutically-acceptable material, composition or vehicle, such as a liquid or solid filler, diluent, excipient, or solvent encapsulating material, involved in carrying or transporting the miktoarm conjugate from one organ, or portion of the body, to another organ, or portion of the body. Each carrier is "acceptable" in the sense of being compatible with the other ingredients of the formulation and not injurious to the patient when administered in doses sufficient to provide a therapeutically effective amount of the miktoarm conjugate. Non-limiting examples of materials that can serve as pharmaceutically-acceptable carriers include sugars, such as lactose, glucose and sucrose; starches, such as corn starch and potato starch; cellulose, and its derivatives, such as sodium carboxymethyl cellulose, ethyl cellulose and cellulose acetate; powdered tragacanth; malt; gelatin; talc; excipients, such as cocoa butter and suppository waxes; oils, such as peanut oil, cottonseed oil, safflower oil, sesame oil, olive oil, corn oil and soybean oil; glycols, such as propylene glycol; polyols, such as glycerin, sorbitol, mannitol and polyethylene glycol; esters, such as ethyl oleate and ethyl laurate; agar; buffering agents, such as magnesium hydroxide and aluminum hydroxide; alginic acid; pyrogen-free water; isotonic saline; Ringer's solution; ethyl alcohol; pH buffered solutions; polyesters, polycarbonates and/or polyanhydrides; and other non-toxic compatible substances employed in pharmaceutical formulations.

The miktoarm conjugates and compositions containing such conjugates may be orally administered, parenterally administered, subcutaneously administered, and/or intravenously administered for carrying out the methods of the invention. In certain embodiments, a miktoarm conjugate or pharmaceutical composition containing a conjugate is administered orally. In other embodiments, the miktoarm conjugate or pharmaceutical composition containing a conjugate is administered intravenously or via injection into a target site such as a tumor or muscle. Alternative routes of administration include sublingual, intramuscular, and transdermal administrations.

In some embodiments of the invention, the miktoarm conjugate or composition containing a conjugate is applied to a biological sample, such as a blood sample or other tissue obtained from a subject, such as a human or other mammal. In this case, the miktoarm conjugate is optionally labelled with one or more detectable labels.

Also provided are kits for inhibiting gene expression of a target polynucleotide. In one embodiment of this aspect, the kit contains at least one type of miktoarm conjugate as described herein or a plurality of types of miktoarm conjugates providing a plurality of different oligonucleotides as described herein. The oligonucleotides on the conjugate have one or more sequences complementary (or sufficiently complementary as disclosed herein) to one or more sequences of a portion of a target polynucleotide. The kit optionally includes one or more additional type of miktoarm conjugate which has a sequence complementary to a second portion of the target polynucleotide or to a second target sequence.

In some embodiments of the kits provided, oligonucleotides include a detectable label or the kit includes a detectable label which can be attached to the oligonucleotides or the miktoarm conjugate.

EXAMPLES

Example 1: Synthesis of Miktoarm Conjugates Via a Convergent Approach

To demonstrate the synthesis for the miktoarm conjugates described herein, a convergent approach, i.e. oligonucleotide and PEG side chains are sequentially coupled to a multivalent core, is designed (FIG. 1). An 18-mer antisense DNA sequence against the human epidermal growth factor receptor 2 (Her2) transcript is selected as a model strand (sequence: 5' TTT CTC CAT GGT GCT CAC 3') (SEQ ID: 3). Strain-promoted click reaction involving dibenzocyclooctyne (DBCO)-modified DNA is used to functionalize the azide-presenting cores in order to avoid Cu-induced damage to the nucleobases. A DBCO group resides at the 5' of the sequence (for 5'-end conjugation) or on the thymine C5 methyl group (for conjugation at internal position, Table 1 below). The latter is to further reduce DNA exposure and promote protection by bringing the center of the DNA closer to the backbone. For the PEG component, chains with two different MW (Mn=5 or 10 kDa, PDI <1.03) were chosen, which should produce miktoarm structures with an oligonucleotide loading content (weight %) of 8.1% and 4.5%, respectively.

Figure 2:
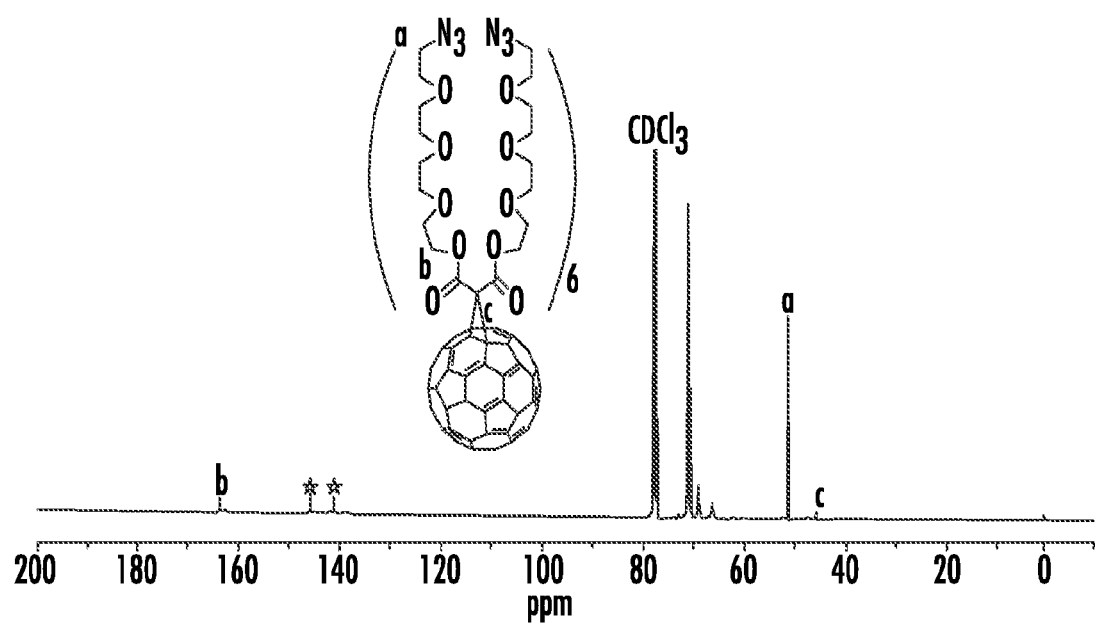
FIG. 2 is a $^{13}C$ NMR spectrum of dodecaazido-functionalized fullerene Coo core in $CDCl_3$. The two peaks in the $sp^2$ region (starred) indicate that the product is a hexakis adduct due to the Th symmetry.
Figure 3:
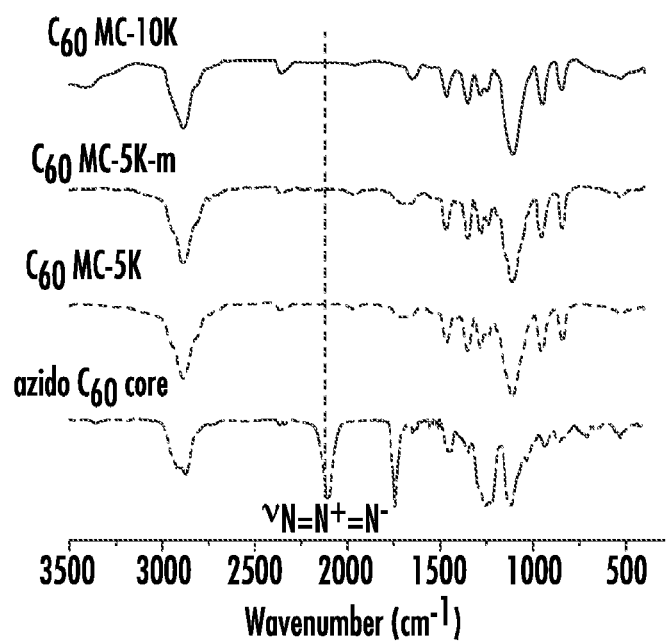
FIG. 3 shows FT-IR spectra of the dodecaazido fullerene $C_{60}$ core and $C_{60}$ MC. The loss of the azide vibration indicates complete consumption of the azide residues.
Figure 4:
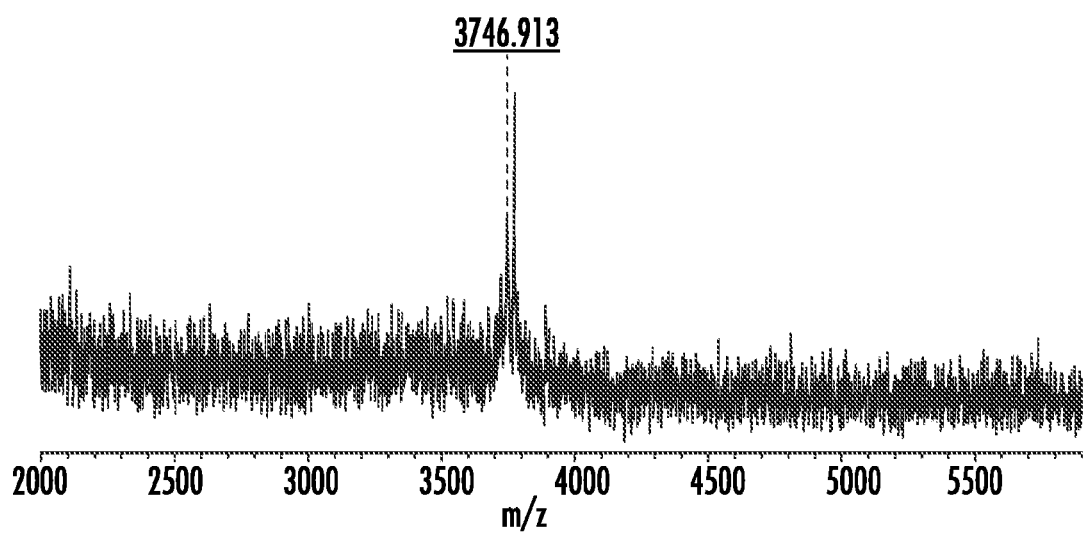
FIG. 4 shows a matrix-assisted laser desorption ionization time-of-flight mass spectrometry (MALDI-ToF MS) pattern of the dodecaazido fullerene $C_{60}$ core. $[M+H]^+$: m/z calculated 3746.32, found 3746.91. Matrix: α-cyano-4-hydroxycinnamic acid.

A dodecaazido fullerene $C_{60}$ core was synthesized by coupling a symmetric malonic ester, bis(azidotetraethylene glycol) malonate, to fullerene $C_{60}$ in the presence of $CBr_4$, 1,5-diaza-bicy-clo [4.3.0]non-5-ene (DBU), and o-dichlorobenzene, which yielded a hexakis adduct with a well-defined Th octahedral symmetry and 12 surface azides. The successful synthesis was confirmed by 13C NMR spectroscopy (showing two $sp^2$ peaks due to the Th symmetry), FT-IR spectroscopy (presence of azide vibration), and matrix-assisted laser-desorption ionization-time of flight mass spectrometry (FIGS. 2, 3, and 4).

In the first coupling step, a large excess of the Coo core was used to derivatize DNA. The stoichiometry ensures that modification of a single site on the multivalent core is favored. After coupling, reversed-phase HPLC was used to purify the DNA-$C_{60}$ conjugates, which appeared as a single sharp band in native polyacrylamide (12%) gel electrophoresis (PAGE), migrating slightly slower compared to free DNA. Had two or more DNA strands attached to the same core, electrophoretic migration would be much slower, as demonstrated using a dimer of the DNA. In the second step, an excess of DBCO-modified PEG (Mn=5 or 10 kDa) was used to derivatize the remaining azides of the core, and the product was purified by aqueous gel permeation chromatography (GPC). The successful synthesis of $C_{60}$ miktoarm conjugate is evidenced by the unimodal, very narrow size distributions in the GPC chromatograms (FIG. 5a). Interestingly, the mid-chain anchored miktoarm conjugate with 5 kDa PEG ($C_{60}$ MC-5k-m) exhibits a slightly longer retention time than the 5' anchored miktoarm conjugate ($C_{60}$ MC-5k) despite having identical MW, which suggests that the $C_{60}$ MC-5k-m is a more compact structure with possibly less exposure of the DNA. FT-IR spectroscopy of the purified and lyophilized conjugates showed complete disappearance of the characteristic azide stretching vibration (2,105 $cm^{-1}$, FIG. 3), indicating that the azides have been fully consumed. Agarose gel electrophoresis (1%) shows an upward-migrating band for the miktoarm conjugates due to the large amount of PEG, which transiently interacts with passing cations (FIG. 5b). The ζ-potentials of $C_{60}$ MC-10k, $C_{60}$ MC-5k-m, and $C_{60}$ MC-5k are −3.6, −10.0, and −16.0 mV, respectively, all of which are much less negative than that of free DNA (−27 mV). The miktoarm conjugates exhibit highly uniform sizes and a spherical shape, and dry-state diameters of ~42-50 nm as evidenced by atomic force microscopy (AFM, FIG. 5c), which are consistent with dynamic light scattering (DLS) hydrodynamic size measurements (FIG. 5d).

Figure 6:
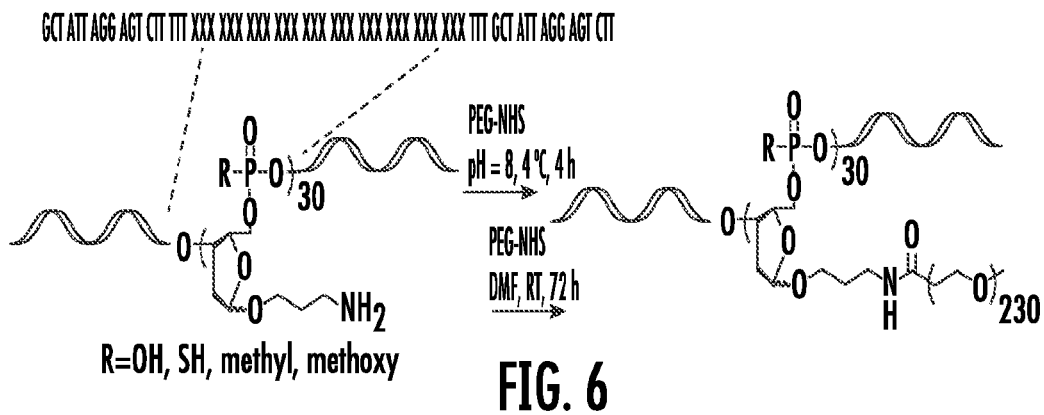
FIG. 6 shows the schematics for synthesizing fullerene linear miktoarm conjugates using a combined divergent/convergent approach.

Example 2: Synthesis of Miktoarm Conjugates Via a Combined Divergent/Convergent Approach In a second method, the miktoarm conjugate is synthesized by a combined divergent/convergent approach (See FIG. 6). In this method, solid-phase phosphoramidite chemistry is used to synthesize a tri-segment sequence: a normal oligonucleotide sequence, followed by 30 repeating custom-made amidites, followed by another oligonucleotide sequence. The full sequence of the triblock strand is: 5'-GCT ATT AGG AGT CTT TTT XXX XXX XXX XXX XXX XXX XXX TTT GCT ATT AGG AGT CTT-3' (SEQ ID: 1). The X units are custom designed unnatural nucleotides that bears one amine group per X unit (for later coupling to PEG). The R group on unit X is important; it must be sufficiently hydrophobic, for example a methyl group, for the final miktoarm conjugate to undergo efficient cell uptake. The two other segments consist of identical sequences, which are complementary to a sequence in the 3' untranslated region of KRAS mRNA. This tri-segment structure is purified using reversed phase HPLC, before the middle segment (the X nucleotides) is grafted with PEG side chains (Mn=10 kDa, PDI <1.03) in a quantitative manner. This process ensures a precise number of oligonucleotides per conjugate (exactly two) and dictates a target MW which can be used as a quality control measure. For example, any deviation from the target MW of more than 17% is deemed unacceptable (the 17% number is based upon a previous study showing that a minimum of 25 strands of PEG is needed to achieve the typical biological properties of brush polymer-based pacDNA) (Jia et al J. Am. Chem. Soc. 2017; 139, 10605). Herein, "divergent" refers to the fact that the backbone was synthesized from constituent monomers, and "convergent" refers to how PEG side chains come together on the tri-segment backbone. The miktoarm conjugate has a linear backbone and is thus termed linear-MC-10k.

Figure 7:
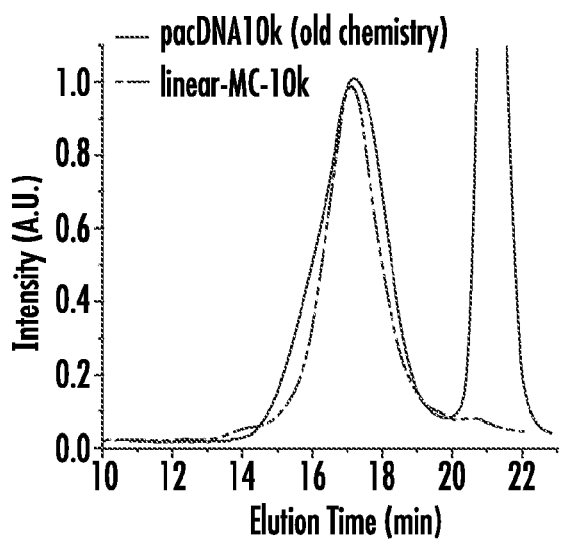
FIG. 7 is a comparison of polymer molecular weight distribution by DMF gel permeation chromatography. Red: pacDNA-10k made with ROMP chemistry. Blue: linear-MC-10k made using new divergent/convergent chemistry, showing similar molecular weight and narrower distribution.
Figure 8:
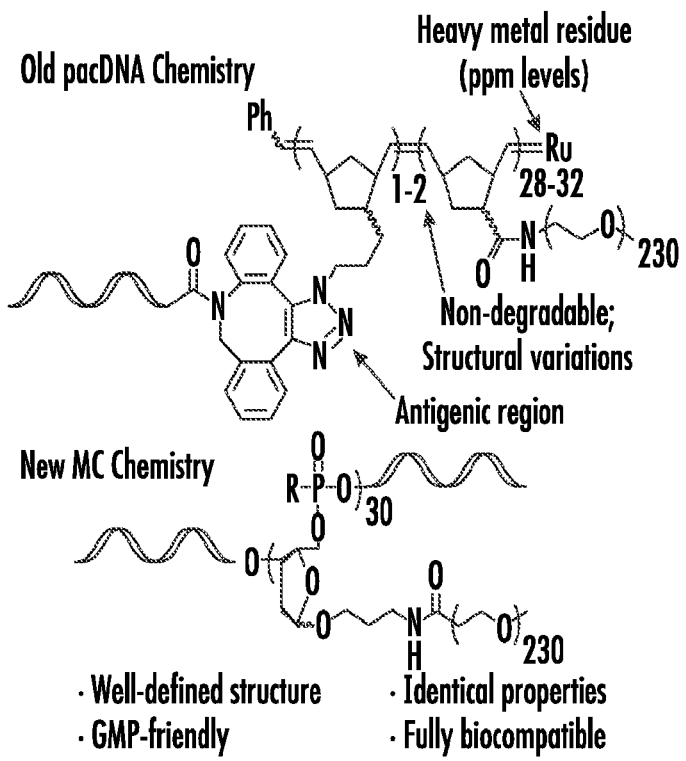
FIG. 8 is a comparison of brush polymer-based pacDNA chemistry and the miktoarm conjugate chemistry disclosed herein, highlighting differences that benefit therapeutics development.

Preferably, complete PEG derivatization of the middle segment occurs. To avoid the presence of a large number of triazoles in the pacDNA resulting from azide-alkyne click chemistry, which may induce anti-triazole immunity, amidation chemistry between primary amines and reactive ester-modified PEG is adopted. The duration of this reaction (~4 h at 0° C.) is limited by the hydrolysis of the reactive ester in an aqueous media, which is the best solvent for the oligonucleotide. However, this limitation is removed by a two-stage reaction scheme: an initial partial PEG derivatization of the triblock sequence in water, followed by drying and further reaction in dry dimethylformamide. The latter stage is preferably carried out over 72 h to ensure quantitative grafting. Analytical batches (milligram scale) of linear-MC-10k show undetectable (<5%) deviation from the target MW in repeated, independent syntheses, as determined by dimethylformamide (DMF) GPC, which also shows reduced polydispersity for the miktoarm conjugates compared to brush polymer-based pacDNA (FIG. 7). Importantly, the new chemistry is devoid of heavy metal catalysts used for traditional pacDNA synthesis (of which trace amounts may be retained in the product), reduces the potential for anti-triazole immunity, and improves biocompatibility by using naturally occurring chemicals (FIG. 8).

Example 3: Nuclease Resistance of Miktoarm Conjugates

Figure 9:
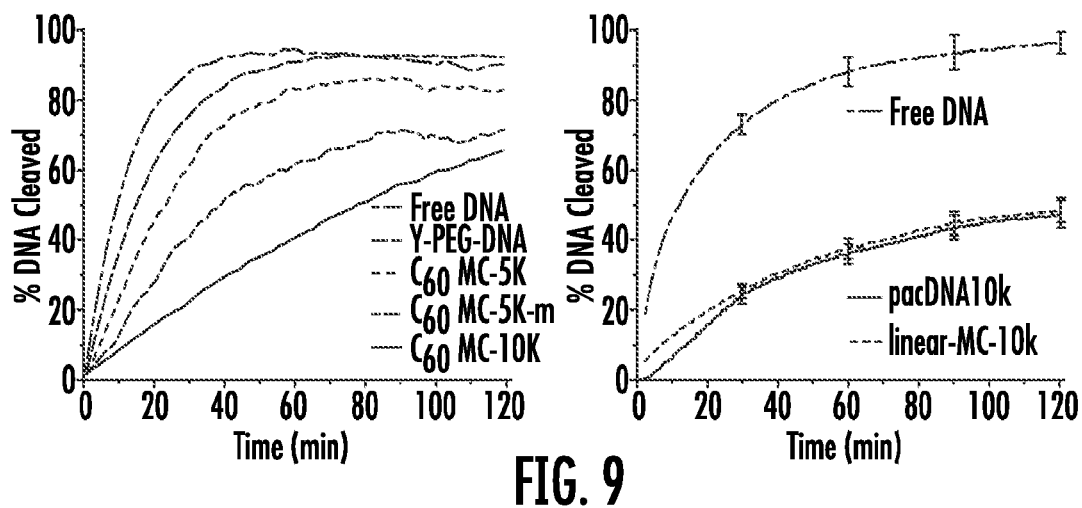
FIG. 9 DNase I retardation assay. Enzymatic cleavage results in restoration of fluorescence. Both forms of miktoarm conjugates resist degradation.

The ability of the miktoarm conjugates to retard nuclease degradation, a hallmark feature of brush polymer-based pacDNAs, was investigated. The fluorescence of fluorescein-labeled miktoarm conjugate is quenched by hybridization with a dabcyl-labeled complementary strand. Upon addition of DNase I, the double-stranded DNA is cleaved, leading to the liberation of the fluorophore and an increase of fluorescence. Both $C_{60}$ MC-10k and linear-MC-10k exhibit extended DNase I half-life (t1/2) compare with that of free DNA (9-15× longer, FIG. 9), on par with brush polymer-based $pacDNA_{10k}$. On the other hand, the $C_{60}$ MC-5k imparts limited protection to the DNA, showing only ca. 2.2× longer t1/2. This result is not unexpected because the fluorophore is located at the periphery (3') of the DNA; the portion that extends beyond the PEG "cloud" should experience a rapid drop-off in steric shielding. By attaching the DNA via a midchain anchor to the core $C_{60}$-MC-5k-m, the t1/2 is improved to 4.5× that of free DNA. In contrast, a Y-shaped PEG-DNA conjugate (each PEG arm 20 kDa; 40 kDa total MW) is unable to effectively protect the DNA strand (~1.3× longer t1/2). These results corroborate that the molecular weight of the PEG side chains, their density/arrangement, and the position of the DNA relative to the backbone are all important factors for steric shielding.

Figure 10A:
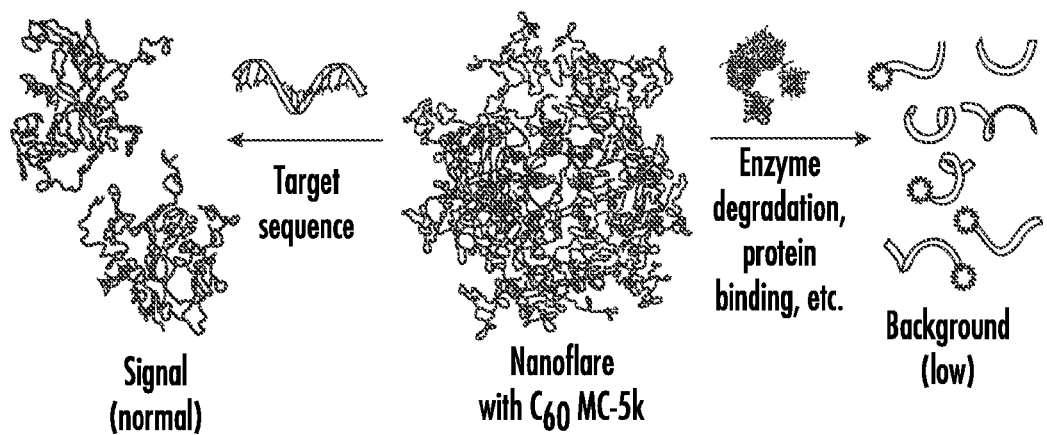
FIGS. 10A-10C demonstrate nanoflares based upon $C_{60}$ MC-5k. 10A) Schematics showing how the nanoflares generate signals vs. background. 10B) Response of nanoflares (both MC and free DNA versions) to added target strand. 10C) Response of nanoflares to added DNase I as a model source of background fluorescence.
Figure 10B:
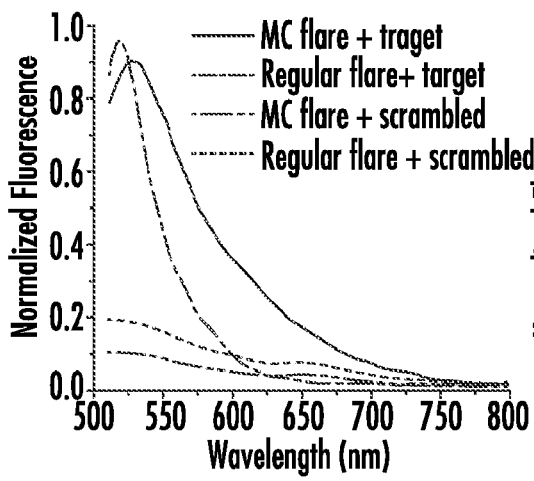
Figure 10C:
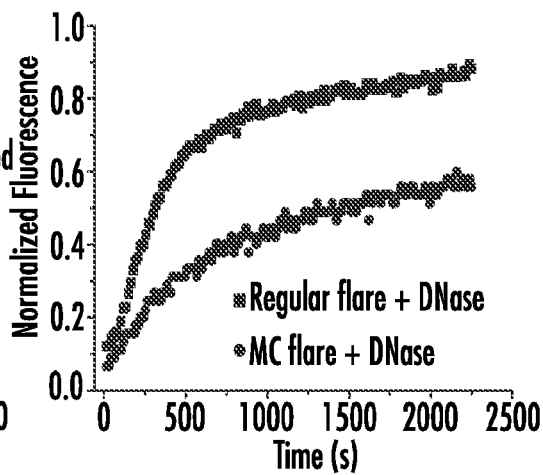
Figure 11A:
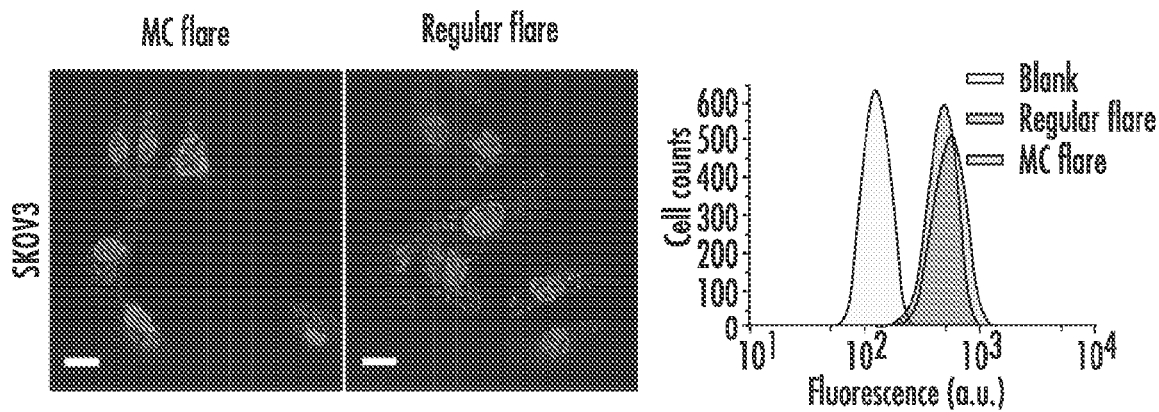
FIG. 11A-11C show confocal microscopy and flow cytometry measurements of (10A) SKOV3, (10B) MCF7, and (10C) B16 cells treated with normal or $C_{60}$ MC-5k nanoflares (0.5 μM total DNA; scale bar: 25 μm).
Figure 11B:
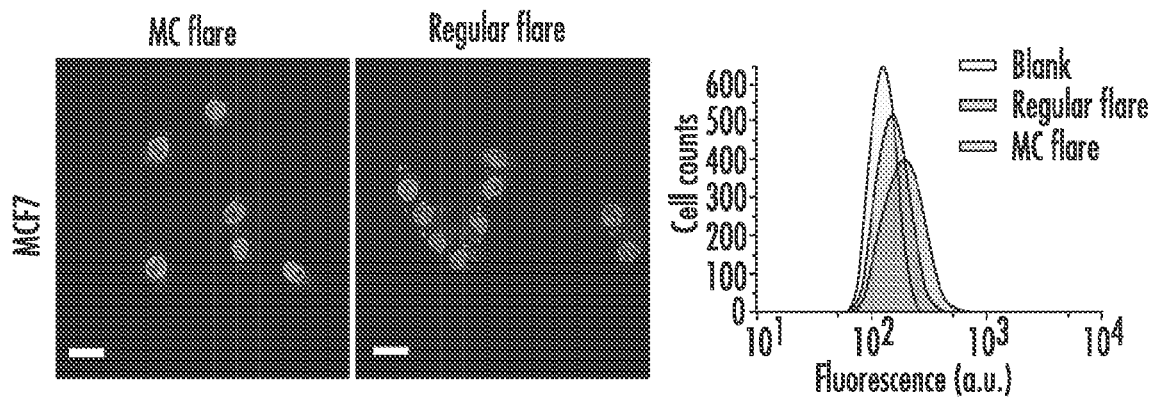
Figure 11C:
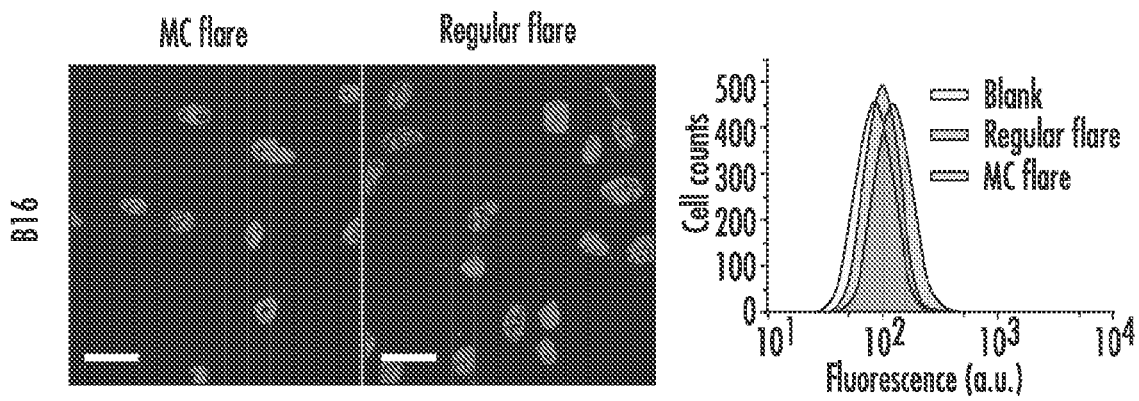

Example 4: Using Miktoarm Conjugates to Reduce False Positives in Diagnostics The improved binding selectivity for complementary sequence vs. proteins and the well-defined molecular architecture make the miktoarm conjugate an attractive material for constructing higher-order structures, such as nanoflares. In a typical nanoflare, double-stranded DNA consisting of a fluorophore-labeled reporter strand and a sticky end is attached to a gold nanoparticle (AuNP) core, which is a fluorescence quencher, via a thiol-gold bond. Upon displacement by a target strand, the fluorophore-containing reporter is freed and regains its fluorescence, thereby indicating the presence of the target (FIG. 10a). With such a design, enzymatic degradation of the DNA and non-specific binding to proteins may contribute to false positive signals. We constructed a nanoflare targeting Her2 using an antisense $C_{60}$ MC-5k hybridized to a thiol-labeled sense strand and compared it to a flare made with free DNA. When DNase I was added to the flares, the $C_{60}$ MC-5k version exhibited significantly lower background fluorescence over time compared with the free DNA-based flare, presumably due to retardation of protein-DNA interactions by the dense PEG corona (FIG. 10c). When the nanoflares were incubated with a Her2-over-expressing cell line, SKOV3 (human ovarian), clear responses were observed by flow cytometry and confocal microscopy for both forms of the nanoflares (FIG. 11). However, when the particles were incubated with Her2 low-expressing (MCF7, human breast adenocarcinoma) and non-expressing (B16, mouse melanoma) cells, the normal nanoflares exhibited higher background signals than the pacDNA flares. These results indicate that $C_{60}$ MC-5k flares are less prone to background signals and are better suited to detecting low-abundance target transcripts.

Example 5: Cell Uptake of Miktoarm Conjugates

Figure 12:
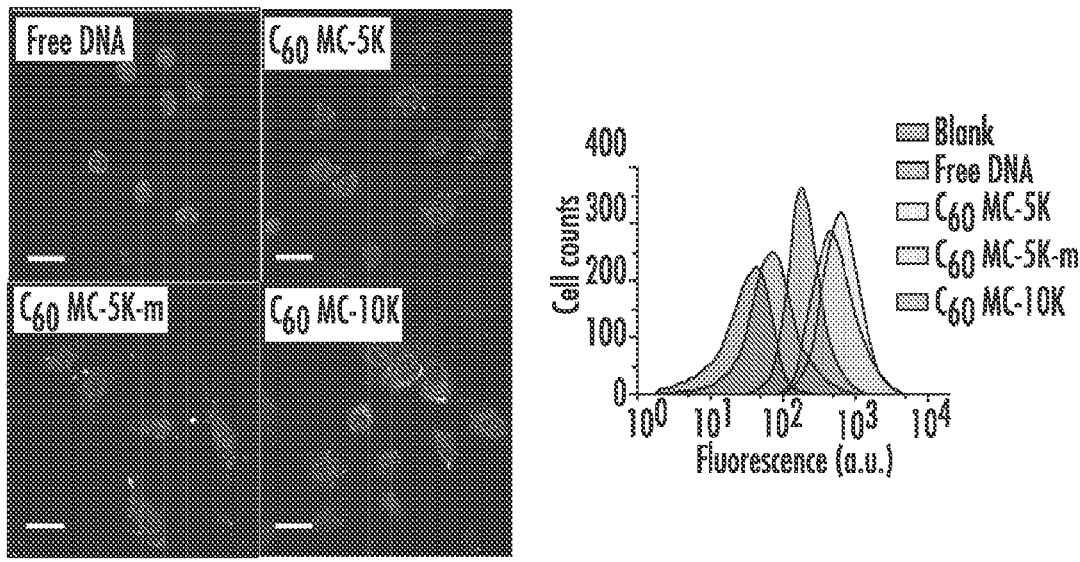
FIGS. 12A and 12B show cellular uptake. 12A) Confocal microscopy images showing increased uptake for $C_{60}$ MCs vs. free DNA. Images were taken using identical settings (scale bar=25 μm). 12B) Flow cytometry measurement (total cell count: 10,000) of SKOV3 cells treated with MCs and free DNA.

In order for the miktoarm conjugate to achieve high antisense activity in vitro, efficient cellular uptake is important. The uptake of the $C_{60}$ MCs in SKOV3 cells, a human ovarian cancer line showing overexpression of the Her2 oncogene, was studied. Cells were incubated with fluorescein-labeled miktoarm conjugates and free DNA (1 µM DNA) in serum-free medium for 6 h. Confocal microscopy and flow cytometry showed an ascending order in uptake for free DNA, $C_{60}$ MC-5k, $C_{60}$ MC-5k-m, and $C_{60}$ MC-10k, with ~10× difference between the highest and the lowest (FIG. 12). Interestingly, the two $C_{60}$ MC-5k structures exhibited different levels of uptake (6.6× for $C_{60}$ MC-5k-m and 2.7× for $C_{60}$ MC-5k vs. free DNA; free DNA is 1×). The lower uptake for $C_{60}$ MC-5k is attributed to the extra DNA exposure and associated negative charge. These results confirm that the miktoarm conjugates can successfully replicate the uptake characteristics of brush polymer-based pacDNA in a molecularly well-defined form.

Example 6: Effect of Miktoarm Conjugates on Gene Expression

Figure 13:
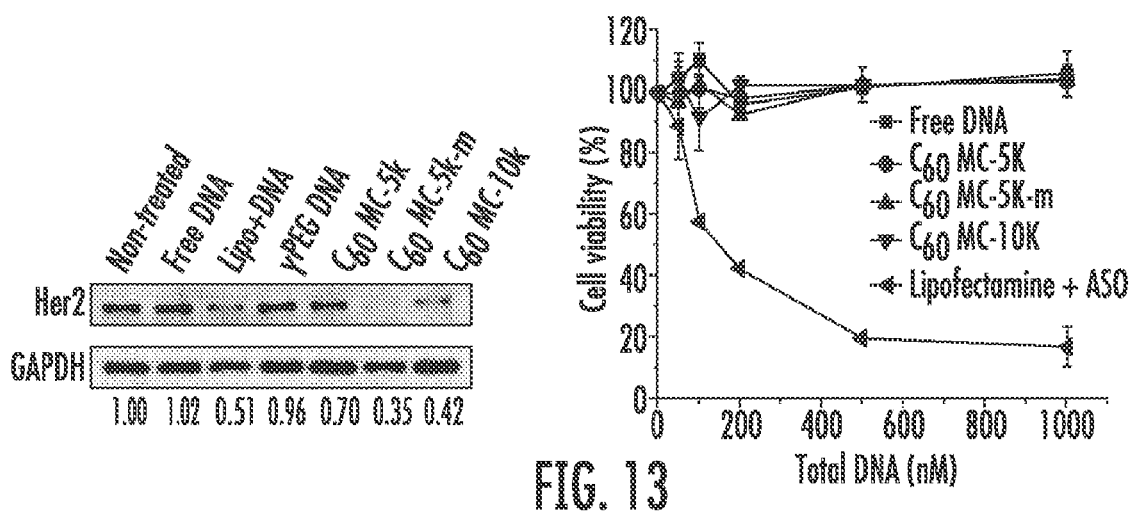
FIG. 13A is a Western blot analysis Her2 protein levels of SKOV3 cells treated with $C_{60}$ MCs and controls (500 nM DNA).
FIG. 13B shows proliferation of SKOV3 cells treated with $C_{60}$ MCs, free DNA, and Lipo6000™-DNA complexes.

We evaluated the ability of the $C_{60}$ MCs to knock-down protein expression via antisense regulation of Her2 transcripts in SKOV3 cells. The cells were incubated with samples and controls (500 nM or 1 µM DNA) in serum-free medium for 15 h, followed by additional culturing in full-serum media for another 48 h. The cells were then harvested, and Her2 expression was detected by Western blotting (FIG. 13a). It was found that the Coo MC-10k and $C_{60}$ MC-5k-m were able to knockdown Her2 expression at both concentrations, with roughly comparable activities (~60-70% knockdown), suggesting that some levels of endosomal escape took place. In comparison, the $C_{60}$ MC-5k exhibited lower antisense activities (~30%-40% knockdown), while a Y-shaped PEG-DNA conjugate (each PEG arm 20 kDa; 40 kDa total MW) was ineffective. Lipo6000™-DNA complexes were used as a positive control following manufacturer-suggested protocols, which yielded ~50% knockdown. However, the $C_{60}$ MCs were far less cytotoxic (FIG. 13b). These results demonstrate that the miktoarm conjugates disclosed herein are self-transfecting agents that do not require a polycationic transfection carrier, which are considered to have better translational potential.

Example 7: Effect of Miktoarm Conjugates on Plasma Pharmacokinetics

Figure 14:
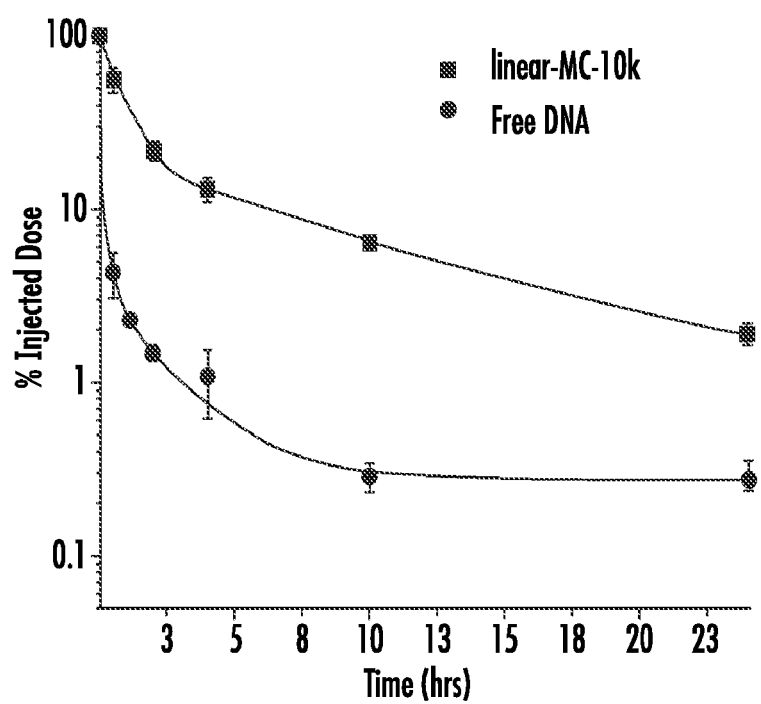
FIG. 14 is a graph of plasma pharmacokinetics of linear-MC-10k and free DNA in immunocompetent mice.

One main mechanism for anticancer nanomedicine systems to reach the pathological site is through blood circulation and extravasation via compromised vasculature, followed by intratumoral retention. Therefore, the dosage requirements for achieving high enough tumor concentration of the nanomedicine strongly depend on the longevity of the drug in blood circulation. To evaluate the plasma pharmacokinetics of the miktoarm conjugate, immunocompetent C57BL/6 mice were injected in the tail vein with free DNA or linear-MC-10k (both labeled with Cy5) at equal DNA concentrations. Blood samples at various predetermined time points up to 24 h were collected and analyzed (FIG. 14). Both samples rapidly distributed into tissues with distribution half-lives ($t_{1/2\alpha}$)≤30 min, but linear-MC-10k showed much longer elimination half-lives ($t_{1/2\beta}$~3 h) compared with free DNA ($t_{1/2\beta}$=27 min). There were also substantial differences in plasma concentration. At 1 h post injection, there was only ~0.9% of the injected free DNA remaining in the plasma. The linear-MC-10k were much more effective in blood retention, with >50% of the injected dose remaining in circulation at 1 h. The differences in blood concentration and elimination rates resulted in substantially elevated blood availability of the linear-MC-10k compared with free DNA, as determined by area under the curve (AUC) ($AUC_{linear-MC-10k,\infty}/AUC_{free\ DNA,\infty}$=~12.5).

Materials and Methods Used in the Examples Above

ω-amine terminated poly(ethylene glycol) methyl ethers (Mn=5 and 10 kDa, PDI≤1.03) were purchased from Shanghai Ponsure Biotech. Inc., China. Succinimidyl carboxymethyl ester-terminated poly(ethylene glycol) methyl ethers (Mn=10 kDa, PDI=1.05) was purchased from Jenkem Technology, USA. Dibenzocyclooctyne (DBCO)-N-hydroxysuccinimide (NHS) ester was purchased from Sigma-Aldrich Co., USA. DNA synthesis reagents were purchased from Glen Research Co., USA. Qubit™ ssDNA Assay Kit was obtained from Thermo Fisher Scientific, Inc., USA. HPLC-grade acetonitrile was purchased from TEDIA Co. Inc., USA. HPLC-grade tetrahydrofuran (THF) was purchased from Oceanpak Co., Sweden. The SKOV3 cell line was obtained from Shanghai Institute of Biological Technology of the Chinese Academy of Sciences. Gibco™ high-glucose Dulbecco's modified eagle medium (DMEM) was purchased from Thermo Fisher Scientific, Inc., USA. Fetal bovine serum (FBS) was obtained from Zhejiang Tianhang Biotechnology Co., Ltd., China. Biological reagents, including HER2/ErbB2 rabbit polyclonal antibody, anti-GAPDH rabbit polyclonal antibody, Hoechst 33342, RIPA Lysis Buffer I, and DNase I, were purchased from Shanghai Sangon Biotech Co., China, or Beyotime Biotech. Co., China. Cell Counting Kit-8 (CCK-8) was purchased from Saint-Bio Co., China. Reagents were used as received unless otherwise indicated. Aqueous gel permeation chromatography (GPC) measurements were performed on a Waters Breeze 2 system (Waters Co., USA) coupled to 2998/410 PDA detectors with two PL aquagel-OH 8 µm MIXED-M columns and a PL aquagel-OH guard column (Agilent Technologies, USA), running at a flow rate of 1.0 mL/min. THF GPC was performed on a Waters Breeze 2 system coupled to a 2998 PDA detector with two PLgel 5 µm MIXED-D columns and a PLgel MIXED guard column (Agilent Technologies, USA), running at a flow rate of 1.0 mL/min. Reversed-phase HPLC was performed on a Waters Breeze 2 system equipped with a 2998 PDA detector and a Waters Symmetry C18 column (3.5 µm, 4.6×150 mm), running at a flow rate of 1.0 mL/min, using triethylammonium acetate (TEAA) buffer (0.1 M) and HPLC-grade acetonitrile as mobile phases. 1HNMR spectra were obtained on a Bruker 400 MHz NMR spectrometer (Bruker Co., Germany). Matrix-assisted laser desorption ionization-time of flight mass spectrometry (MALDI-ToF MS) measurements were performed on a Bruker Ultraflextreme mass spectrometer (Bruker Daltonics Inc., USA). Dynamic light scattering (DLS) and zeta potential data were acquired on a Malvern Zetasizer Nano ZSP instrument (Malvern Panalytical, UK). Atomic force microscopy (AFM) images were obtained on a Dimension Icon AFM (Bruker Co., Germany) using tapping mode on freshly cleaved mica substrates. Gel images were recorded on a FluochemQ imaging system (Protein Simple Inc., USA). 96-well plates were measured using a Spark 10M microplate reader (TECAN Group Ltd., Switzerland). Confocal microscopy images were taken on a Nikon TI-E+A1 microscope (Nikon Co., Japan). Flow cytometry measurements were performed using a BD FACSVerse (BD Biosciences, USA). Fourier transform-infrared spectroscopy (FT-IR) was performed on a Varian 2000 system (Thermo Fischer Scientific, USA) in the range of 400-3500 $cm^{-1}$ and the samples were diluted in KBr solids and compacted to form thin pellets. UV-Visible spectra were obtained using a Cary 50 spectrophotometer (Agilent Technologies, USA). Fluorescence spectra were recorded on a Hitachi F7000 spectrofluorometer (Hitachi High-Technologies, Japan). DNA sequences were synthesized on an ABI 3400 DNA synthesizer (Applied Biosystems, USA) using standard solid phase phosphoramidite methodology. DNA strands were cleaved from the controlled pore glass support using aqueous ammonium hydroxide (28-30% NH3 basis) at 55° C. for 17 h and purified with reversed-phase HPLC.

mL microcentrifuge tube and was shaken for 4 h, before being lyophilized, re-dissolved in water, and purified by reversed-phase HPLC to afford DNA-$C_{60}$ and DNA-m-$C_{60}$ (midchain-anchored DNA) conjugates. The purified conjugates exhibit a slight migration rate difference in polyacrylamide gel electrophoresis (12%, FIG. 14) compared with unmodified DNA. To fully convert the remaining azide groups on the DNA-core conjugates (DNA-$C_{60}$ and DNA-m-$C_{60}$), an excess of DBCO-PEG was mixed with the conjugates in DI water ([DNA]=10 µM; 5:1 DBCO: azide, mol: mol). The reaction mixtures were shaken for 10 days at 35° C. on an Eppendorf Thermomixer C. Thereafter, unreacted PEG was removed by aqueous GPC. FT-IR showed that the azide groups were consumed below undetectable levels (FIG. 3).

To synthesize the Y-shaped PEG (40 kDa)-DNA conjugate (YPEG-DNA), YPEG-azide (12 nmol; the azide is located at the juncture where the two 20 kDa PEG arms meet) and 5' DBCO-functionalized DNA (10 nmol) were dissolved in 300 µL Nanopure™ water in a microcentrifuge

TABLE 1

Oligonucleotide sequences used in this study.

| SEQ ID 1 | Linear-MC | 5'-GCT ATT AGG AGT CTU XXX XXX XXX XXX XXX XXX XXX XXX XXX XXX XXX XX GCT ATT AGG AGT CTTT T-3' |
|---|---|---|
| SEQ ID 2 | Cy5-Linear-MC | 5'-GCT ATT AGG AGT CM XXX XXX XXX XXX XXX XXX XXX XXX XXX XXX XXX XX GCT ATT AGG AGT CTTT T-Cy5-3' |
| SEQ ID 3 | Her2 antisense | 5'-DBCO-TTT CTC CAT GGT GCT CAC-3' |
| SEQ ID 4 | Her2 antisense with mid-chain anchor | 5'-TTT CTC CAT(DBCO) GGT GCT CAC-3' |
| SEQ ID 5 | FAM-labeled Her2 antisense | 5'-DBCO-TTT CTC CAT GGT GCT CAC FAM-3' |
| SEQ ID 6 | FAM-labeled Her2 antisense with mid-chain anchor | 5'-TTT CTC CAT(DBCO) GGT GCT CAC FAM-3' |
| SEQ ID 7 | Dabcyl-labeled Her2 sense | 5'-Dabcyl-GTG AGC ACC ATG GAG -3' |
| SEQ ID 8 | FAM-labeled Her2 antisense (nanoflare) | 5'-DBCO-CTC CAT GGT GCT CAC TGC GGC-FAM-3' |
| SEQ ID 9 | Thiol-labeled Her2 sense (nanoflare) | 5'-SH TTTTTTTTT GCC GCA GTG AGC-3' |
| SEQ ID 10 | Target sequence | 5'-GCC GCA GTG AGC ACC ATG GAG-3' |
| SEQ ID 11 | Scrambled sequence | 5'-GAC TCC TAA TAG CTT TTC CTG-3' |

Synthesis of $C_{60}$ Miktoarm Conjugates and Y-Shaped PEG-DNA Conjugate

The azido-modified $C_{60}$ core was synthesized as follows. Briefly, a difunctional azide linker, bis(azidotetraethylene glycol) malonate, was first prepared in three steps from malonoyl chloride and tetraethylene glycol (~75% overall yield). Next, CBr4 (100 eq.), the malonate linker (10.0 eq.), and 1,8-diazabicyclo[5.4.0]undec-7-ene (DBU, 20.0 eq.) were added successively to a fullerene $C_{60}$ solution (1.00 eq.) in dry o-dichlorobenzene. The reaction mixture was stirred under argon for 72 h at room temperature, followed by column chromatography ($CH_2Cl_2$:MeOH 100:0-97:3 gradient, v: v) to yield a brown oil (~15% yield).

To couple a single DNA strand to the core, DBCO-modified DNA strands (10 nmol in 800 µL water) was mixed with a large excess of the core in 10 µL DMSO (120:1 azide: DBCO, mol: mol). The reaction mixture was placed in a 1.5 tube. The mixture was shaken overnight at room temperature on an Eppendorf Thermomixer C, before being dialyzed against Nanopure™ water using a MINI dialysis unit (MWCO 3500, Thermo Fisher) for desalting. The dialysate was then electrophoresed in 1% agarose gel in 0.5× tris/borate/EDTA (TBE) buffer. The gel band containing the conjugates was excised and electroeluted to isolate the conjugate from the gel. Dialysis against Nanopure™ water was used to remove the TBE buffer from the extracted conjugate.

Synthesis of Linear Miktoarm Conjugates

The backbone and the oligonucleotide component for the linear miktoarm conjugate was synthesized via solid-phase oligonucleotide synthesis. A longer coupling time (10 min) was adopted in the synthesis cycle. Following the synthesis, the backbone compound (with trityl on) was cleaved from the controlled pore glass (CPG) support and deprotected in 30% ammonium/40% methylamine 1:1 (AMA) at 65° C. for 15 mins, and then purified by reversed-phase HPLC. The trityl protecting group was subsequently removed by treatment with 20% acetic acid for 1 h and extracted with ethyl acetate for three times in aqueous solution. Upon lyophilization, 10 nmol of the backbone compound was dissolved in 200 μL sodium bicarbonate solution (pH=8) and cooled to 4° C. Then, NHS-ester-terminated PEG (10 kDa, 100 equiv. to amine groups; each backbone compound has 30 amine groups on X units) was added to the backbone compound solution. The mixture was shaken at 4° C. overnight before being dialyzed in Nanopure water, dried by lyophilization, and re-dissolved in dry DMF (200 μL). Then, NHS-ester-terminated PEG (10 kDa, 100 equiv. to amine groups) was added to the DMF solution together with 10 μL of triethylamine. The mixture was shaken for 72 h at room temperature before being dialyzed against Nanopure water, lyophilized, and purified by aqueous GPC.

Nuclease Degradation Kinetics Assay

Free DNA, Y-shaped PEG-DNA conjugate, $C_{60}$ MCs, and linear MCs (2 μM DNA, FAM- or Cy5-labeled) were each mixed with 2 molar equivalents of complementary, dabcyl-labeled DNA in 1×PBS buffer. The mixtures were heated to 80° C. and cooled slowly in a thermally sealed container to room temperature during a period of 12 h to allow the strands to anneal. The duplexes were then diluted to 500 nM in assay buffer (10 mM Tris, 2.5 mM $MgCl_2$, and 0.5 mM $CaCl_2$), pH=7.5), and 100 μL of each was transferred to a 96-well plate. DNase I was then added and rapidly mixed to give a final concentration of 0.5 unit/mL. The fluorescence of the samples (ex=485 nm, em=530 nm) was measured immediately and every 30s thereafter for 4h using a microplate reader. The endpoint was determined by adding a large excess of DNase I to the mixture, and the fluorescence was monitored until no additional increases were observed.

Preparation and Characterization of MC Nanoflares 13 nm AuNPs, which were used as nanoflare's fluorescence quencher, were prepared. Briefly, 1 mM $HAuCl_4$ aqueous solution (10 mL) was poured into an aqua regia-cleaned 50 mL round-bottom flask and brought to a vigorous boil and reflux while stirring. Then, 0.5 mL of 38.8 mM trisodium citrate solution was added quickly. The solution color turned from pale yellow to clear, to black, then to deep red. After the color change, the solution was refluxed for an additional 15 min, before being cooled to room temperature. The maximum absorption (λmax) for the particles was 520 nm, as shown by UV-vis spectroscopy.

Nanoflares were prepared adopting a freezing method reported by Liu et al (J. Am. Chem. Soc. 2017, 139, 28, 9471). Briefly, FAM-labeled free DNA or $C_{60}$ MC-5k (antisense strand) were each hybridized to their complementary sense strand bearing a sulfhydryl group at the 5' (1:1.2 antisense: sense, mol: mol) in phosphate buffered saline (1×PBS, pH 7.4) via thermal annealing (vide supra). The pre-formed DNA duplexes were then added to citrate-capped AuNP ([AuNP]=10 nM; thiol:AuNP=200:1 mol: mol), and the mixtures were immediately frozen by placing in a freezer (−20° C.). After 2 h, an equal volume of NaCl solution (0.6M) was added atop the frozen mixture, and the reaction vials were slowly warmed to room temperature to give a final [NaCl] of 0.3 M. After thawing, the nanoparticles retain a bright red color, indicating successful functionalization (FIG. 10). The nanoflares were purified by three successive rounds of centrifugation (13000 rcf, 10 min), supernatant removal, and resuspension in Nanopure water. Following the final round of centrifugation, the concentrated nanoparticles were resuspended in 3×PBS.

To test the response of the nanoflares to the target sequence, each sample was treated with an excess of the complementary sequence or a scrambled sequence, followed by incubation at 37° C. for 15 min. The fluorescence spectra were recorded on a spectrofluorometer with excitation at 488 nm and emission from 510 nm to 800 nm. In order to demonstrate possible background signals produced by enzymatic cleavage of the DNA duplex, nanoflares were diluted to 500 nM in DNase I assay buffer, and 100 μL of each sample was transferred to a 96-well black plate. DNase I was added and mixed quickly to give a final concentration of 2 units/mL. The fluorescence of the samples was measured immediately (ex=485 nm, em=530 nm) and every 15 seconds for 1 h using a microplate reader. In both assays, the fluorescence intensities were normalized to maximum-fluorescence endpoints for each sample, determined by dissolving the AuNP quencher using an aliquot of concentrated KCN (2.0 M) in the presence of oxygen.

Cell Culture

Cells were grown in DMEM medium containing 10% fetal bovine serum (FBS), 1% glutamine, and 1% antibiotic. Cells were cultured in a 37° C., 5% $CO_2$ cell incubator.

Confocal Fluorescence Microscopy

To study the cellular uptake of miktoarm conjugates, cells were seeded at a density of $5.0 \times 10^5$ cells/well in 3.5 cm glass-bottom plates and were cultured for 24 h at 37° C. and 5% $CO_2$. Serum-free DMEM containing free DNA or miktoarm conjugates at equal DNA concentration (1 μM) were added to each well, followed by incubation for 6 h at 37° C. Hoechest 33342 nucleus-staining solution for live cells was then added to the medium for 10 min, and cells were fixed with a 4% formaldehyde overnight at 4° C. The cells were then gently washed with PBS (3×) and imaged immediately on a Nikon confocal laser scanning microscope.

Flow Cytometry

Cells were seeded at a density of $2.0 \times 10^5$ cells/well in a 6-well plate and were cultured overnight at 37° C. and 5% $CO_2$. Serum-free DMEM medium containing free DNA, Y-shaped PEG-DNA, and miktoarm conjugates (1 μM DNA) were added to each well followed by incubation for 6 h. The cells were then washed with PBS 3× and harvested by trypsinization. All samples were analyzed immediately by flow cytometry (BD FACS Verse) to determine the extent of cellular internalization.

Western Blotting

Cells were plated in a 24-well plate and cultured for 24 h, before the medium was replaced with serum-free DMEM and samples/controls (DNA [500 nM], $C_{60}$ MCs (500 nM or 1 μM), and Lipo6000™-complexed DNA [200 nM, following manufacturer suggested protocols]) were added. After 15 h, the medium was replaced with fresh, full-growth medium, and cells were cultured for another 48 h. Whole-cell lysates were prepared using 100 μL of radioimmunoprecipitation assay (RIPA) Cell Lysis Buffer. Protein concentrations were determined using a Nanodrop 2000 spectrophotometer (Thermo Fischer Scientific, USA). Equal amounts (35 μg) of protein samples were fractionated by 4-20% precast gradient gels, transferred to a polyvinylidene difluoride (PVDF) membrane, and blocked with 5% nonfat milk in tris-buffered saline with Tween 20 (TBST) for 1 h at room temperature. Proteins were analyzed by western blotting with rabbit primary antibody against Her2 (1,000:1, Cell Signaling Technology, Inc., USA), rabbit primary antibody against GAPDH (1,000:1, Shanghai Sangon Biotech. Co., China), and HRP-conjugated goat anti-rabbit IgG secondary antibody (2,000:1, Shanghai Sangon Biotech. Co., China) using an ECL Western blotting substrate.

Cytotoxicity Assay

The cytotoxicity of $C_{60}$ MCs was evaluated using the CCK-8 assay. Briefly, SKOV3 cells were seeded in a 96-well plate in 100 μL medium and cultured for 24 h. The cells were then treated with free DNA and $C_{60}$ MCs at varying concentrations of total DNA (50, 100, 200, 500, 1000 nM). Lipo6000™ was used as a positive control under the condition suggested by the manufacturer. Cells treated with culture medium were used as a negative control. After 24 h, the cell-counting kit 8 (CCK-8) regent was added (10 μL/well). The cells were further incubated for 2h, and the absorbance at 450 nm was recorded using a microplate reader.

Pharmacokinetics

Immunocompetent mice (C57BL/6) were used to examine the pharmacokinetics of Cy5-labeled linear-MC-10K and free DNA. Mice were randomly divided into two groups (n=4). Samples were intravenously administrated via the tail vein at equal DNA concentration (500 nmol/kg). The blood samples (50 μL) were collected from the submandibular vein at varying time points (30 min, 2 h, 4 h, 10 h, and 24 h) using BD Vacutainer™ blood collection tubes with sodium heparin. Heparinized plasma was obtained by centrifugation at 3000 rpm for 15 min, aliquoted into a 96-well plate, and measured for fluorescence intensity on a BioTek® Synergy HT (BioTek Instruments Inc., VT, USA). The amounts of linear-MC-10K and DNA in the blood samples were estimated using standard curves established for each sample in freshly collected plasma. To establish the standard curves, samples of known quantities were incubated with freshly collected plasma for 1 h at room temperature before fluorescence was measured.

What is claimed is:

1. A miktoarm conjugate, comprising a backbone core; a predetermined number of from 5 to 50 polymer arms covalently linked to the backbone core; and a predetermined number of from 1 to 10 oligonucleotides covalently linked to the backbone core,
  wherein each of the oligonucleotides is sufficiently complementary to a target polynucleotide to hybridize to the target polynucleotide or can bind to a non-nucleic acid target under predetermined conditions;

and wherein:
  a) the backbone core is linear, and wherein the miktoarm conjugate does not comprise a triazole; or
  b) the backbone core is non-linear.

2. The miktoarm conjugate of claim 1, wherein the polymer arms are poly(ethylene glycol).

3. The miktoarm conjugate of claim 1, wherein the oligonucleotide is selected from single-stranded DNA, double-stranded DNA, single-stranded RNA, double-stranded RNA, aptamers, ribozymes, DNAzymes, antisense oligonucleotides, exon-skipping oligonucleotides, siRNA oligonucleotides, triple helix forming oligonucleotides, ribozymes, DNAzymes, chemically modified forms thereof, and combinations thereof.

4. The miktoarm conjugate of claim 1, wherein the length and density of the polymer arms are sufficient to protect the 1 to 10 oligonucleotides via steric hindrance.

5. The miktoarm conjugate of claim 1, wherein:
a) the linear backbone core is selected from synthetic polymers, natural biopolymers or modified forms of biopolymers; or
b) the non-linear backbone core comprises a fullerene $C_{60}$.

6. The miktoarm conjugate of claim 1, wherein the predetermined number of oligonucleotides comprise at least one antisense oligonucleotide.

7. A composition comprising the miktoarm conjugate of claim 1 and a pharmaceutically acceptable carrier.

8. The miktoarm conjugate of claim 1, wherein the 1 to 10 oligonucleotides comprise from 8 to 30 bases each.

9. The miktoarm conjugate of claim 8, wherein each of the 1 to 10 oligonucleotides is independently conjugated to the backbone core at the 5' or 3' end of the oligonucleotide or attached via a non-terminal site within the sequence of the oligonucleotide.

10. The miktoarm conjugate of claim 8, wherein the 1 to 10 oligonucleotides are conjugated to the backbone core via a cleavable bond.

11. The miktoarm conjugate of claim 8, wherein the 1 to 10 oligonucleotides comprise oligonucleotides of different lengths and/or different sequences.

12. The miktoarm conjugate of claim 8, wherein at least one of the 1 to 10 oligonucleotides is covalently attached to the backbone core via a non-terminal site of the oligonucleotide.

13. The miktoarm conjugate of claim 8, wherein the polymer arms comprise PEG and the 1 to 10 oligonucleotides comprise at least one double or single stranded DNA oligonucleotide covalently linked to the backbone core, and wherein the backbone core is linear and comprises an oligonucleotide.

14. A method of knocking down expression of a gene product encoded by a target polynucleotide comprising contacting the target polynucleotide with the miktoarm conjugate of claim 8, wherein said contacting occurs in an absence of a transfection vector.

15. The method of claim 14, wherein the target polynucleotide is selected from eukaryotic, prokaryotic, and viral polynucleotides.

16. The method of claim 15, wherein the target polynucleotide is a polynucleotide specific to a mammalian cancer cell, a non-cancer mammalian cell, a plant cell, a bacterium, or a virus.

17. A method of synthesizing the miktoarm conjugate of claim 1, wherein the backbone core is non-linear, by sequentially coupling oligonucleotide and polymer side chains to a multivalent core, said method comprising the steps of:
(1) synthesizing a plurality of multivalent core molecules;
(2) conjugating said multivalent core molecules to oligonucleotide strands and polymer arms to form a mixture containing a miktoarm conjugate; and
(3) separating the miktoarm conjugate from the mixture of step (2); wherein the polymer arms and the oligonucleotides are conjugated to the multivalent core molecules via separate reactions.

18. A method of synthesizing the miktoarm conjugate of claim 1, wherein the backbone core is linear, comprising the steps of:
(1) synthesizing a tri-segment sequence comprising a first segment comprising a first oligonucleotide sequence covalently linked to the 5' end of a second segment comprising a plurality of hydrophobic repeating nucleotide units, said second segment covalently linked at the 3' end to a third segment comprising a second oligonucleotide sequence, wherein the repeating nucleotide units in the second segment each comprise one amine group,
(2) purifying the tri-segment sequence;
(3) partially derivatizing the triblock sequence with PEG or other non-biofouling polymers bearing a terminal reactive ester in an aqueous buffer, followed by drying, and further derivatization in dry dimethylformamide for a sufficient period of time to ensure quantitative grafting; and
(4) purifying the triblock sequence of step (3);
wherein said method is carried out in the absence of a heavy metal catalyst.

* * * * *

SEQUENCE LISTING

```
<160> NUMBER OF SEQ ID NOS: 12

<210> SEQ ID NO 1
<211> LENGTH: 68
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (17)..(51)
<223> OTHER INFORMATION: An unnatural nucleotide bearing an amine group
      and a hydrophobic group, such as OH, SH, methyl and methoxy
<220> FEATURE:
<221> NAME/KEY: source
<223> OTHER INFORMATION: /note="See specification as filed for detailed
      description of substitutions and preferred embodiments"

<400> SEQUENCE: 1
gctattagga gtctttnnnn nnnnnnnnnn nnnnnnnnnn nnnnnnnnnn ngctattagg      60
agtctttt                                                              68

<210> SEQ ID NO 2
<211> LENGTH: 68
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (17)..(51)
<223> OTHER INFORMATION: An unnatural nucleotide bearing an amine group
      and a hydrophobic group, such as OH, SH, methyl and methoxy
<220> FEATURE:
<221> NAME/KEY: source
<223> OTHER INFORMATION: /note="See specification as filed for detailed
      description of substitutions and preferred embodiments"

<400> SEQUENCE: 2
gctattagga gtctttnnnn nnnnnnnnnn nnnnnnnnnn nnnnnnnnnn ngctattagg      60
agtctttt                                                              68

<210> SEQ ID NO 3
<211> LENGTH: 18
<212> TYPE: DNA
<213> ORGANISM: Artificial Sequence
<220> FEATURE:
```

```
<221> NAME/KEY: source
<223> OTHER INFORMATION: /note="Description of Artificial Sequence:
      Synthetic oligonucleotide"

<400> SEQUENCE: 3
tttctccatg gtgctcac                                                 18

<210> SEQ ID NO 4
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 4
tttctccatg gtgctcac                                                 18

<210> SEQ ID NO 5
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 5
tttctccatg gtgctcac                                                 18

<210> SEQ ID NO 6
<211> LENGTH: 18
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 6
tttctccatg gtgctcac                                                 18

<210> SEQ ID NO 7
<211> LENGTH: 15
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 7
gtgagcacca tggag                                                    15

<210> SEQ ID NO 8
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 8
ctccatggtg ctcactgcgg c                                             21
```

```
<210> SEQ ID NO 9
<211> LENGTH: 22
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 9 ttttttttttt gccgcagtga gc                                            22

<210> SEQ ID NO 10
<211> LENGTH: 21
<212> TYPE: DNA
<213> ORGANISM: Unknown
<220> FEATURE:
<221> NAME/KEY: source
<223> OTHER INFORMATION: /note="Description of Unknown:
      target sequence"

<400> SEQUENCE: 10
gccgcagtga gcaccatgga g                                              21

<210> SEQ ID NO 11
<211> LENGTH: 21
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"

<400> SEQUENCE: 11
gactcctaat agcttttcct g                                              21

<210> SEQ ID NO 12
<211> LENGTH: 66
<212> TYPE: DNA
<213> ORGANISM: Artificial Sequence
<220> FEATURE:
<221> NAME/KEY: source
<223> OTHER INFORMATION: /note="Description of Artificial Sequence:
      Synthetic oligonucleotide"
<220> FEATURE:
<221> NAME/KEY: modified_base
<222> LOCATION: (19)..(48)
<223> OTHER INFORMATION: An unnatural nucleotide bearing an amine group
      and a hydrophobic group, such as OH, SH, methyl and methoxy
<220> FEATURE:
<221> NAME/KEY: source
<223> OTHER INFORMATION: /note="See specification as filed for detailed
      description of substitutions and preferred embodiments"

<400> SEQUENCE: 12
gctattagga gtcttttnn nnnnnnnnn nnnnnnnnnn nnnnnnntt tgctattagg        60 agtctt                                                               66
```